(12) United States Patent
Xu et al.

(10) Patent No.: US 11,791,847 B2
(45) Date of Patent: Oct. 17, 2023

(54) LOW-COST TRANSCEIVER STRUCTURE FOR WIRELESS COMMUNICATION AND SENSING

(71) Applicant: Huawei Technologies Co., Ltd., Shenzhen (CN)

(72) Inventors: Luzhou Xu, San Diego, CA (US); Ricky Lap Kei Cheung, San Diego, CA (US); Hsing Kuo Lo, San Diego, CA (US); Yan Li, San Diego, CA (US); Yuan Su, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 18 days.

(21) Appl. No.: 17/370,657

(22) Filed: Jul. 8, 2021

(65) Prior Publication Data
US 2021/0336638 A1 Oct. 28, 2021

Related U.S. Application Data

(63) Continuation of application No. PCT/CN2020/070561, filed on Jan. 7, 2020.

(60) Provisional application No. 62/790,082, filed on Jan. 9, 2019.

(51) Int. Cl.
*H04B 1/00* (2006.01)
*H04B 1/04* (2006.01)
*H04B 7/0413* (2017.01)

(52) U.S. Cl.
CPC ............. *H04B 1/0003* (2013.01); *H04B 1/04* (2013.01); *H04B 7/0413* (2013.01)

(58) Field of Classification Search
CPC ...... H04B 1/0003; H04B 1/04; H04B 7/0413; G01S 7/35
See application file for complete search history.

(56) References Cited

U.S. PATENT DOCUMENTS

| | | | |
|---|---|---|---|
| 10,382,087 B1* | 8/2019 | Dror | H04B 1/48 |
| 2007/0230616 A1* | 10/2007 | Zolfaghari | H03F 3/24 |
| | | | 375/297 |
| 2010/0245091 A1* | 9/2010 | Singh | G01S 13/56 |
| | | | 340/573.1 |
| 2017/0086202 A1* | 3/2017 | Chen | H04L 67/30 |
| 2017/0120058 A1 | 5/2017 | Ghosh et al. | |
| 2017/0293025 A1* | 10/2017 | Davis | G01S 7/023 |
| 2017/0331714 A1* | 11/2017 | Yang | H04W 74/0808 |

(Continued)

FOREIGN PATENT DOCUMENTS

| | | |
|---|---|---|
| CN | 105786185 A | 7/2016 |
| CN | 108290068 A | 7/2018 |
| WO | 2020044192 A1 | 3/2020 |

*Primary Examiner* — Vineeta S Panwalkar
(74) *Attorney, Agent, or Firm* — Slater Matsil, LLP

(57) ABSTRACT

Embodiments of this disclosure provide a system and method for wireless communication and wireless sensing in a low-cost common transceiver structure. In particular, the common transceiver structure may have a common digital-to-analog converter (DAC) configured to convert a digital wireless communication signal and a digital wireless sensing signal into an analog wireless communication signal and an analog wireless sensing signal, respectively. The common transceiver may also have a common transmitting antenna configured to transmit the analog wireless communication signal and the analog wireless sensing signal.

22 Claims, 10 Drawing Sheets

(56) References Cited

U.S. PATENT DOCUMENTS

2018/0095160 A1* 4/2018 Perez-Ramirez ...... H04K 3/822
2018/0348339 A1 12/2018 Lien et al.
2020/0112939 A1* 4/2020 Scharf ................. H04W 64/003

* cited by examiner

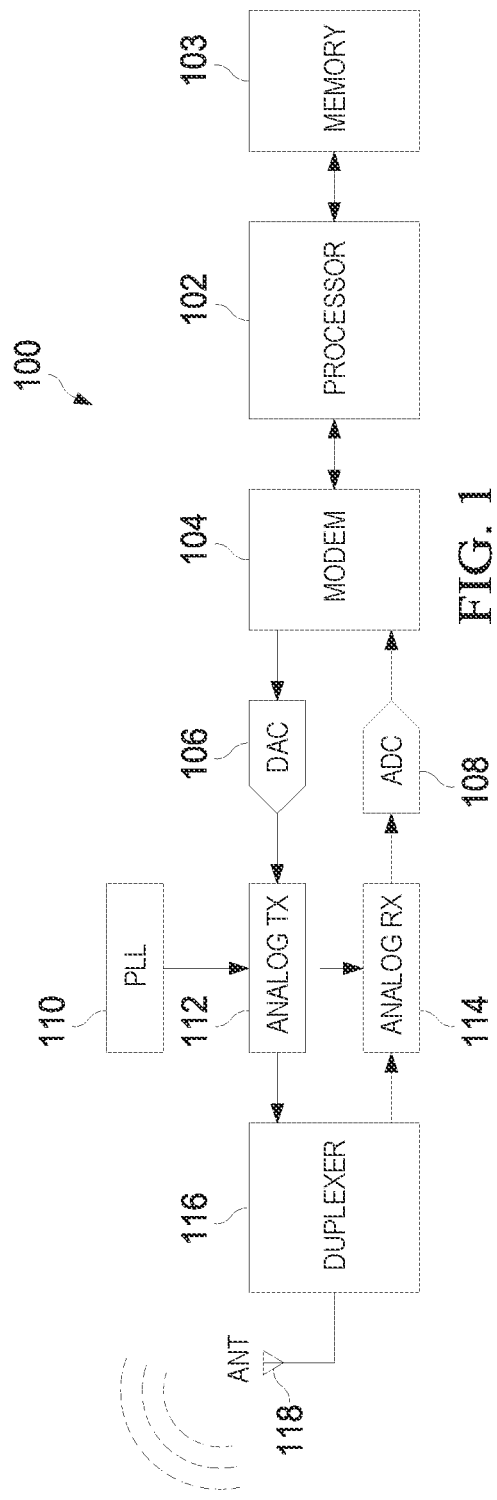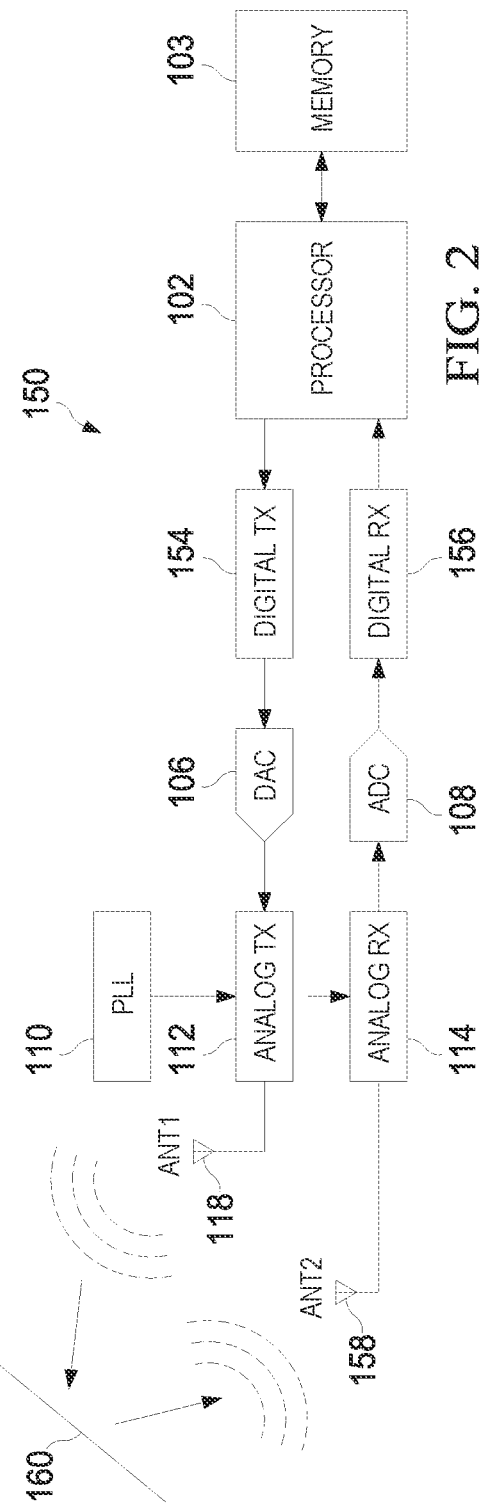

LOW-COST TRANSCEIVER STRUCTURE FOR WIRELESS COMMUNICATION AND SENSING

CROSS-REFERENCE TO RELATED APPLICATIONS

This application is a continuation of International Application No. PCT/CN2020/070561, filed on Jan. 7, 2020, which claims priority to U.S. provisional patent application Ser. No. 62/790,082, filed on Jan. 9, 2019 and entitled "low-Cost Transceiver Structure for Wireless Communication and Sensing", which is incorporated herein by reference as if reproduced in its entirety.

TECHNICAL FIELD

The present disclosure relates generally to wireless communications, and, in particular embodiments, to a system and method of operating a common transceiver for wireless sensing and wireless communications.

BACKGROUND

Wireless communications and wireless sensing are two types of electromagnetic radio wireless signaling that have applications in a variety of fields. Typically, a transceiver, namely an electronic circuit that includes both a transmitter and a receiver, is embedded in an electronic device to transmit and receive wireless radio frequency (RF) electromagnetic waves.

In a transceiver used for wireless communications, data is exchanged between two devices over a wireless communication bridge. Wireless communications can vary widely, in terms of operating frequency and delivery. Examples of wireless communications are mobile communications, wireless network communications, Bluetooth communications, and near field communications (NFCs). In a transceiver used for wireless sensing, an electromagnetic signal is transmitted and a reflection of the electromagnetic signal is received in a sensing modality used, for example, in interactive systems and/or applications. In each system, signals are generated, transmitted, received, and processed in accordance with applicable operating conditions.

SUMMARY

Technical advantages are generally achieved by embodiments of this disclosure, which describes a system and method of operating a common transceiver for wireless sensing and wireless communications.

In accordance with an embodiment, an apparatus and a method for wireless communications and wireless sensing is provided. The method includes converting, by a common digital-to-analog converter (DAC) of a device, a digital wireless communication signal and a digital wireless sensing signal into an analog wireless communication signal and an analog wireless sensing signal, respectively. The method further includes transmitting the analog wireless communication signal and the analog wireless sensing signal over a common transmitting antenna of the device.

In one example, the method further includes generating, by a common processor and a modem of the device, a digital wireless communication signal and generating, by the common processor and a wireless sensing digital transmitter of the device, a digital wireless sensing signal. Optionally, in such an example, or in another example, the transmitting the analog wireless communication signal and the analog wireless sensing signal over the common transmitting antenna of the device includes amplifying, by a common transmit amplifier, the analog wireless communication signal and the analog wireless sensing signal and transmitting the amplified analog wireless communication signal and the amplified analog wireless sensing signal over the common transmitting antenna.

Optionally, in any one of the above-mentioned examples, or in another example, the method further includes receiving, over a common receiving antenna of the device, a second analog wireless communication signal and a second analog wireless sensing signal, the second analog wireless sensing signal being a reflected analog signal of the amplified analog wireless sensing signal and amplifying, by a common receive amplifier of the device, the second analog wireless communication signal and the second analog wireless sensing signal.

Optionally, in any one of the above-mentioned examples, or in another example, the method further includes converting, by a common analog-to-digital converter (ADC) of the device, the second analog wireless communication signal and the second analog wireless sensing signal into a second digital wireless communication signal and a second digital wireless sensing signal, respectively. Optionally, in any one of the above-mentioned examples, or in another example, the method further includes converting, by a first analog-to-digital converter (ADC) of the device, the second analog wireless communication signal to a second digital wireless communication signal; and converting, by a narrowband analog baseband receiver and a second ADC of the device, comprising a higher resolution ADC with a lower sampling rate than the first ADC, the second analog wireless sensing signal to a second digital wireless sensing signal, the second analog wireless sensing signal having a lower bandwidth and a larger dynamic range than the second analog wireless communication signal.

Optionally, in any one of the above-mentioned examples, or in another example, the method further includes processing, by the common processor and the modem, the second digital wireless communication signal; and processing, by the common processor and a wireless sensing digital receiver of the device, the second digital wireless communication signal. Optionally, in any one of the above-mentioned examples, or in another example, the method further includes synchronizing a phase component of the analog wireless communication signal and a phase component of the analog wireless sensing signal using a common phase-locked loop of the device.

Optionally, in any one of the above-mentioned examples, or in another example, the method further includes synchronizing a phase component of the second analog wireless communication signal and a phase component of the second analog wireless sensing signal using the common phase-locked loop. Optionally, in any one of the above-mentioned examples, or in another example, the wireless sensing is used for at least one of gesture recognition, health monitoring, activity recognition, sleep quality detection, or a combination thereof.

Optionally, in any one of the above-mentioned examples, or in another example, the method further includes converting, by a second common DAC of the device, a third digital wireless communication signal and a third digital wireless sensing signal into a third analog wireless communication signal and a third analog wireless sensing signal, respectively; and transmitting the third analog wireless communication signal and the third analog wireless sensing signal over a second common transmitting antenna of the device.

Optionally, in any one of the above-mentioned examples, or in another example, each analog wireless communication signal transmitted over each common transmitting antenna is used in a multiple-input multiple-output (MIMO) type of wireless communications radar technique. Optionally, in any one of the above-mentioned examples, or in another example, each analog wireless sensing signal transmitted over each common transmitting antenna is used in a multiple-input multiple-output (MIMO) type of wireless sensing radar technique to detect a direction of an object causing a reflection of each transmitted analog wireless sensing signal.

Optionally, in any one of the above-mentioned examples, or in another example, the method further includes receiving, over a second common receiving antenna of the device, a fourth analog wireless communication signal and a fourth analog wireless sensing signal, the fourth analog wireless sensing signal being a reflected analog signal of one of the first or third amplified analog wireless sensing signals; and amplifying, by a second common receive amplifier of the device, the fourth analog wireless communication signal and the fourth analog wireless sensing signal. Optionally, in any one of the above-mentioned examples, or in another example, the method further includes alternatively sampling, by a switch of the device, the fourth analog wireless sensing signal and the second analog wireless sensing signal; and detecting, by the wireless sensing digital receiver and the common processor, a direction of an object causing the reflection of the first or third amplified analog wireless sensing signals in accordance with the alternative sampling.

In accordance with another embodiment, a transceiver for wireless communication and wireless sensing is provided. The transceiver includes a common digital-to-analog converter (DAC) configured to convert a digital wireless communication signal and a digital wireless sensing signal into an analog wireless communication signal and an analog wireless sensing signal, respectively; and a common transmitting antenna configured to transmit the analog wireless communication signal and the analog wireless sensing signal. In one example, the transceiver further includes a common processor; a modem in communication with the common processor configured to generate a digital wireless communication signal; and a wireless sensing digital transmitter in communication with the common processor configured to generate a digital wireless sensing signal.

Optionally, in such an example, or in another example, the transceiver further includes a common transmit amplifier in communication with the common DAC, the common transmit amplifier configured to amplify the analog wireless communication signal and the analog wireless sensing signal. Optionally, in any one of the above-mentioned examples, or in another example, the transceiver further includes a common receiving antenna configured to receive a second analog wireless communication signal and a second analog wireless sensing signal, the second analog wireless sensing signal being a reflected analog signal of the amplified analog wireless sensing signal; and a common receive amplifier configured to amplify the second analog wireless communication signal and the second analog wireless sensing signal.

Optionally, in any one of the above-mentioned examples, or in another example, the transceiver further includes a common analog-to-digital converter (ADC) configured to convert the second analog wireless communication signal and the second analog wireless sensing signal into a second digital wireless communication signal and a second digital wireless sensing signal, respectively. Optionally, in any one of the above-mentioned examples, or in another example, the transceiver further includes a first analog-to-digital converter (ADC) configured to convert the second analog wireless communication signal to a second digital wireless communication signal; a narrowband analog baseband receiver, and a second ADC comprising a higher resolution ADC with a lower sampling rate than the first ADC configured to convert the second analog wireless sensing signal to a second digital wireless sensing signal, the second analog wireless sensing signal having a lower bandwidth and a larger dynamic range than the second analog wireless communication signal.

Optionally, in any one of the above-mentioned examples, or in another example, the modem in communication with the common processor is further configured to process the second digital wireless communication signal. Optionally, in any one of the above-mentioned examples, or in another example, the transceiver further includes a wireless sensing digital receiver in communication with the common processor is further configured to process the second digital wireless communication signal. Optionally, in anyone of the above-mentioned examples, or in another example, further includes a phase locked loop in communication with the common transmit amplifier configured to synchronize a phase component of the second analog wireless communication signal and a phase component of the second analog wireless sensing signal.

Optionally, in any one of the above-mentioned examples, or in another example, the wireless sensing is used for at least one of gesture recognition, health monitoring, activity recognition, sleep quality detection, or a combination thereof. Optionally, in any one of the above-mentioned examples, or in another example, the transceiver further includes a second common DAC configured to convert a third digital wireless communication signal and a third digital wireless sensing signal into a third analog wireless communication signal and a third analog wireless sensing signal, respectively; and a second common transmitting antenna configured to transmit the third analog wireless communication signal and the third analog wireless sensing signal.

Optionally, in any one of the above-mentioned examples, or in another example, each analog wireless communication signal transmitted over each common transmitting antenna is used in a multiple-input multiple-output (MIMO) type of wireless communications radar technique. Optionally, in any one of the above-mentioned examples, or in another example, each analog wireless sensing signal transmitted over each common transmitting antenna is used in a multiple-input multiple-output (MIMO) type of wireless sensing radar technique to detect a direction of an object causing a reflection of each transmitted analog wireless sensing signal. Optionally, in any one of the above-mentioned examples, or in another example, the transceiver further includes a second common receiving antenna configured to receive a fourth analog wireless communication signal and a fourth analog wireless sensing signal, the fourth analog wireless sensing signal being a reflected analog signal of one of the first or third amplified analog wireless sensing signals; and a second common receive amplifier configured to amplify the fourth analog wireless communication signal and the fourth analog wireless sensing signal. Optionally, in any one of the above-mentioned examples, or in another example, the transceiver further includes a switch configured to alternatively sample the fourth analog wireless sensing signal and the second analog wireless sensing signal, wherein the wireless sensing digital receiver and the common processor are further configured to detect a direction of an object causing the reflection of the first or third amplified analog wireless sensing signals in accordance with the alternative sampling.

In accordance with yet another embodiment a transceiver for wireless communication and wireless sensing is provided. The transceiver includes a common digital-to-analog converter (DAC); a common transmitting antenna; a non-transitory memory storage comprising instructions; and one or more common processors in communication with the common DAC, the common transmitting antenna, and the non-transitory memory storage, wherein the one or more common processors execute the instructions to convert a digital wireless communication signal and a digital wireless sensing signal into an analog wireless communication signal and an analog wireless sensing signal, respectively, and transmit the analog wireless communication signal and the analog wireless sensing signal over the common transmitting antenna.

In one example, the transceiver further includes a modem and a wireless sensing digital transmitter in communication with the one or more common processors, the one or more common processors execute the instructions to generate, by the modem and the one or more common processors, a digital wireless communication signal; and generate, by the wireless sensing digital transmitter and the one or more common processors, a digital wireless sensing signal. Optionally, in such an example, or in another example, the transceiver further includes a common transmit amplifier in communication with the common DAC and the one or more common processors, the one or more common processors execute the instructions to amplify, by the common transmit amplifier, the analog wireless communication signal and the analog wireless sensing signal.

Optionally, in any one of the above-mentioned examples, or in another example, the transceiver further includes a common receiving antenna and a common receive amplifier in communication with the one or more common processors, the one or more common processors execute the instructions to receive, by the second common antenna, a second analog wireless communication signal and a second analog wireless sensing signal, the second analog wireless sensing signal being a reflected analog signal of the amplified analog wireless sensing signal; and amplify, by the common receive amplifier, the second analog wireless communication signal and the second analog wireless sensing signal.

Optionally, in any one of the above-mentioned examples, or in another example, the transceiver further includes a common analog-to-digital converter (ADC) in communication with the one or more common processors, the one or more common processors execute the instructions to convert, by the common ADC, the second analog wireless communication signal and the second analog wireless sensing signal into a second digital wireless communication signal and a second digital wireless sensing signal, respectively. Optionally, in any one of the above-mentioned examples, or in another example, the transceiver further includes a first analog-to-digital converter (ADC) and a second ADC, the second ADC comprising a narrowband analog baseband receiver, the one or more common processors execute the instructions to convert, by the first ADC, the second analog wireless communication signal to a second digital wireless communication signal; and convert, by the second ADC, the second analog wireless sensing signal to a second digital wireless sensing signal, the second ADC being a higher resolution ADC with a lower sampling rate than the first ADC, the second analog wireless sensing signal having a lower bandwidth and a larger dynamic range than the second analog wireless communication signal.

Optionally, in any one of the above-mentioned examples, or in another example, the one or more common processors execute the instructions to process, by the modem, the second digital wireless communication signal. Optionally, in any one of the above-mentioned examples, or in another example, the transceiver further includes a wireless sensing digital receiver in communication with the one or more common processors, wherein the one or more common processors execute the instructions to process, by the wireless sensing digital receiver, the second digital wireless communication signal. Optionally, in any one of the above-mentioned examples, or in another example, the transceiver further includes a phase locked loop in communication with the one or more common processors and the common transmit amplifier, the one or more common processors execute the instructions to synchronize a phase component of the second analog wireless communication signal and a phase component of the second analog wireless sensing signal.

Optionally, in any one of the above-mentioned examples, or in another example, the wireless sensing is used for at least one of gesture recognition, health monitoring, activity recognition, or sleep quality detection. Optionally, in any one of the above-mentioned examples, or in another example, the transceiver further includes a second common DAC and a second common transmitting antenna in communication with the one or more common processors, wherein the one or more common processors execute the instructions to convert, by the second common DAC, a third digital wireless communication signal and a third digital wireless sensing signal into a third analog wireless communication signal and a third analog wireless sensing signal, respectively; and transmit the third analog wireless communication signal and the third analog wireless sensing signal over the second common transmitting antenna of the device.

Optionally, in any one of the above-mentioned examples, or in another example, each analog wireless communication signal transmitted over each common transmitting antenna is used in a multiple-input multiple-output (MIMO) type of wireless communications radar technique. Optionally, in any one of the above-mentioned examples, or in another example, each analog wireless sensing signal transmitted over each common transmitting antenna is used in a multiple-input multiple-output (MIMO) type of wireless sensing radar technique to detect a direction of an object causing a reflection of each transmitted analog wireless sensing signal.

Optionally, in any one of the above-mentioned examples, or in another example, the transceiver further includes a second common receiving antenna and a second common receive amplifier in communication with the one or more common processors, wherein the one or more common processors execute the instructions to receive, over the second common receiving antenna, a fourth analog wireless communication signal and a fourth analog wireless sensing signal, the fourth analog wireless sensing signal being a reflected analog signal of one of the first or third amplified analog wireless sensing signals; and amplify, by the second common receive amplifier, the fourth analog wireless communication signal and the fourth analog wireless sensing signal. Optionally, in any one of the above-mentioned examples, or in another example, the transceiver further includes a switch in communication with the one or more common processors, wherein the one or more common processors execute the instructions to alternatively sample, by the switch, the fourth analog wireless sensing signal and the second analog wireless sensing signal; and detect a direction of an object causing the reflection of the first or third amplified analog wireless sensing signals in accordance with the alternative sampling.

In accordance with another embodiment, a transceiver for wireless communication and wireless sensing is provided. The transceiver includes a common RF analog receiver configured to down-convert an RF wireless communication signal and an RF wireless sensing signal into an analog wireless communication signal and an analog wireless sensing signal, respectively; a first analog-to-digital converter (ADC) configured to convert the analog wireless communication signal to a digital wireless communication signal; and a second ADC comprising a higher resolution ADC with a lower sampling rate than the first ADC configured to convert the analog wireless sensing signal to a digital wireless sensing signal, the analog wireless sensing signal having a lower bandwidth and a larger dynamic range than the analog wireless communication signal. In one example, the transceiver further includes a plurality of antennas configured for operation in a multiple-input multiple-output (MIMO) radar technique operation for wireless communications and wireless sensing. Optionally, in such an example, or in another example, the transceiver further includes a common digital-to-analog converter (DAC) configured to convert a second digital wireless communication signal and a second digital wireless sensing signal into a second analog wireless communication signal and a second analog wireless sensing signal, respectively; and a common transmitting antenna configured to transmit the second analog wireless communication signal and the second analog wireless sensing signal.

Optionally, in any one of the above-mentioned examples, or in another example, the transceiver further includes a common processor; a modem in communication with the common processor configured to generate the second digital wireless communication signal; and a wireless sensing digital transmitter in communication with the common processor configured to generate the second digital wireless sensing signal. Optionally, in any one of the above-mentioned examples, or in another example, the transceiver further includes a common transmit amplifier in communication with the common DAC, the common transmit amplifier configured to amplify the second analog wireless communication signal and the second analog wireless sensing signal. Optionally, in any one of the above-mentioned examples, or in another example, the transceiver further includes a common receiving antenna configured to receive the analog wireless communication signal and the analog wireless sensing signal, the analog wireless sensing signal being a reflected analog signal of the second analog wireless sensing signal; and a common receive amplifier configured to amplify the analog wireless communication signal and the analog wireless sensing signal.

Optionally, in any one of the above-mentioned examples, or in another example, the common RF analog receiver further includes a narrowband analog baseband receiver configured to down-convert the RF wireless sensing signal to the analog wireless sensing signal. Optionally, in any one of the above-mentioned examples, or in another example, the modem in communication with the common processor is further configured to process the digital wireless communication signal. Optionally, in any one of the above-mentioned examples, or in another example, the transceiver further includes a wireless sensing digital receiver in communication with the common processor configured to process the digital wireless sensing signal. Optionally, in any one of the above-mentioned examples, or in another example, the transceiver further includes a phase locked loop in communication with the common RF analog receiver, the phase locked loop configured to synchronize a phase component of the RF wireless communication signal and a phase component of the RF analog wireless sensing signal with a common clock.

Optionally, in any one of the above-mentioned examples, or in another example, the wireless sensing is used for at least one of gesture recognition, health monitoring, activity recognition, sleep quality detection, or a combination thereof. Optionally, in any one of the above-mentioned examples, or in another example, the transceiver further includes a second common DAC configured to convert a third digital wireless communication signal and a third digital wireless sensing signal into a third analog wireless communication signal and a third analog wireless sensing signal, respectively, and a second common transmitting antenna configured to transmit the third analog wireless communication signal and the third analog wireless sensing signal.

Optionally, in any one of the above-mentioned examples, or in another example, each analog wireless sensing signal transmitted over each common transmitting antenna is used in a multiple-input multiple-output (MIMO) type of wireless sensing radar technique to detect a direction of an object causing a reflection of each transmitted analog wireless sensing signal. Optionally, in any one of the above-mentioned examples, or in another example, the transceiver further includes a second common receiving antenna configured to receive a fourth analog wireless communication signal and a fourth analog wireless sensing signal, the fourth analog wireless sensing signal being a reflected analog signal of one of the transmitted analog wireless sensing signals; and a second common receive amplifier configured to amplify the fourth analog wireless communication signal and the fourth analog wireless sensing signal.

Optionally, in any one of the above-mentioned examples, or in another example, the transceiver further includes a switch configured to alternatively sample through each received wireless sensing signal from each of a plurality of common receive antennas, wherein the wireless sensing digital receiver and the common processor are further configured to detect a direction of an object causing a reflection of each of a plurality of sensing signals in accordance with the alternative sampling.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 1 is a diagram of an embodiment transceiver for communicating wireless communication signals;

FIG. 2 is a diagram of an embodiment transceiver for communicating wireless sensing signals;

DETAILED DESCRIPTION OF ILLUSTRATIVE EMBODIMENTS

Figure 3:
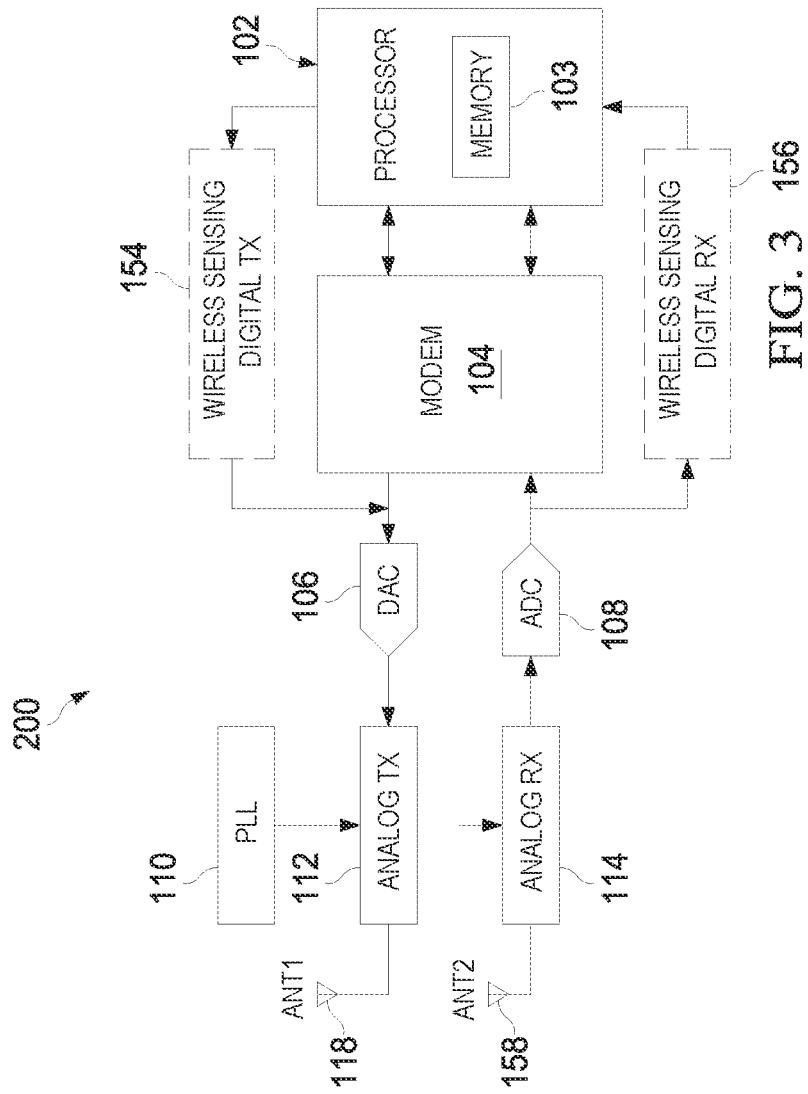
FIG. 3 is a diagram of an embodiment transceiver for communicating wireless communication and wireless sensing signals.

This disclosure provides many applicable inventive concepts that can be embodied in a wide variety of specific contexts. The specific embodiments are merely illustrative of specific configurations and do not limit the scope of the claimed embodiments. Features from different embodiments may be combined to form further embodiments unless noted otherwise. Variations or modifications described with respect to one of the embodiments may also be applicable to other embodiments. Further, it should be understood that various changes, substitutions, and alterations can be made herein without departing from the spirit and scope of this disclosure as defined by the appended claims. While the inventive aspects are described primarily in the context of a component of a smartphone or a smartwatch, it should also be appreciated that those inventive aspects may also be applicable to other devices such as health monitors, heart rate monitors, thermometers, wearable computers, optical head-mounted displays, etc. Similar elements with the same name may be designated with the same or different reference numbers in the various figures.

Mobile telephones and other types of mobile devices are typically equipped with a wireless communications transceiver used to exchange data with other devices. Wireless sensing, when implemented in a device, may additionally provide for exciting opportunities in terms of gesture recognition, health parameter monitoring, personal physiological signal sensing, location detection, object detection, movement detection, etc.

It is therefore advantageous to additionally provide for wireless sensing capabilities in these mobile devices. It should be appreciated that the addition of separate transceivers, applicable to each technology, may be an inefficient implementation method in accomplishing this end, both in terms of financial cost and component footprint cost. However, owing to technical operational differences, a wireless communications transceiver used for wireless communications is not readily used for wireless sensing. Likewise, a transceiver used for wireless sensing is not readily used in wireless communications. In other words, a transceiver solely designed for one application lacks certain components necessary for accomplishing the task of the other.

Embodiments of this disclosure provide techniques and circuit designs for a common transceiver that may be used for both wireless communications and for wireless sensing in a host device. The additional capabilities in the common transceiver are made possible by reusing common component blocks and the intelligent addition of the non-common blocks to common transceiver circuit. The resulting common transceiver is significantly more efficient in terms of monetary and footprint cost than having two distinct transceivers separately performing the same functions. This is particularly advantageous in portable devices, where size and weight can be a limiting factor. Certain embodiments of the present disclosure may advantageously provide wireless sensing capabilities to an existing wireless communication system. In other embodiments, wireless communication capabilities are added to an existing wireless sensing system. In some embodiments of the disclosure, to accommodate the lower bandwidth and/or larger dynamic range of the wireless sensing signal at baseband, the common transceiver may include a dedicated wireless sensing receive path having a narrowband analog baseband receiver and/or a high-resolution low-sampling rate analog-to-digital converter (ADC). In other embodiments, a dedicated wireless sensing transmit path may include a narrowband analog baseband transmitter and/or a narrowband digital-to-analog converter (DAC).

Aspects of this disclosure provide embodiment methods and structures for adding wireless sensing capabilities to wireless communication transceivers having two or more antennas without adding any additional antennas. Multiple wireless sensing transmit and receive paths may be implemented in transceivers having multiple antennas, such as those used in the multiple-input multiple-output (MIMO) radio techniques. Multiple transmit and receive paths may advantageously provide sensing capabilities used for detecting, for example, an objects direction. One or more switches may be used to transmit, receive, or sample the various incoming and outgoing signals. These and other details are discussed in greater detail below.

FIG. 1 is a diagram of an embodiment transceiver 100 used for communicating wireless communication signals in a wireless communications network, which may be installed in a host device. The host device may be any electronic device, such as a smartphone, a smartwatch, a wearable device, a tracking device, etc. As shown, the transceiver 100 includes a processor 102, a memory 103, a modem 104, a digital-to-analog converter (DAC) 106, an analog-to-digital converter (ADC) 108, a phase locked loop (PLL) 110, an analog transmitter (Tx) 112, an analog receiver (Rx) 114, a duplexer 116, and an antenna 118, which may (or may not) be arranged as shown in FIG. 1.

The processor 102 may be any component or collection of components adapted to perform computations and/or other processing related tasks, and the memory 103 may be any component or collection of components adapted to store programming and/or instructions for execution by the processor 102. The modem 104 is used to modulate digital data produced by, for example, the processor 102 to a modulated signal and/or to demodulate a modulated signal to digital data to be processed by, for example, the processor 102. The modem 104 is also known as a mobile broadband modem, a connect card, or a data card. The DAC 106 is a circuit or system that converts a digital signal to an analog signal. In contrast, the ADC 108 is a circuit or system that converts an analog signal to a digital signal. The analog transmitter 112 may be a circuit that includes one or more filters, amplifiers, and/or mixers. The analog transmitter 112 may be used to condition an analog signal, for example, by amplifying the analog signal or by up-converting the analog signal to a different operating frequency. The analog receiver 114 may be a circuit that includes one or more filters, amplifiers, and/or mixers. The analog receiver 114 may be used to condition a received analog signal, for example, by amplifying the analog signal using a low noise amplifier (LNA) or by down-converting the analog signal to a different operating frequency. The phase locked loop 11o is typically used to generate an LO signal that is sent to a mixer of the analog transmitter 112 and a mixer of the analog receiver 114. The LO signal may be used as an input to the analog transmitter 112 to up-convert a transmitting analog signal or as an input to the analog receiver 114 to down-covert a received analog signal. In either case, the phase of the LO signal is synchronized with a clock of the host device for common phase throughout the transceiver 100. The duplexer 116 is any component or collection of components that allow bi-directional communication over a single path. The duplexer 116 isolates the receive path from the transmit path, allowing the transceiver to share a common antenna. In some embodiments, the duplexer 116 may be a switch. In some embodiments, the switch may be controlled by the processor 102. In other embodiments, the duplexer 116 may be a circulator. The antenna 118 may be any device that propagates electromagnetic signals and receives electromagnetic signals through space.

The transmit path of the transceiver 100 includes the processor 102, the modem 104, the DAC 106, the analog transmitter 112, the duplexer 116, and the antenna 118. During signal transmission, the processor 102 and the modem 104 generate a digital wireless communication signal. The digital wireless communication signal is converted, by the DAC 106, to an analog wireless communication signal. The embedded mixer in the analog transmitter 112 receives an LO signal from the phase locked loop, which is phase synchronized with a common clock of the host device. The mixer up-converts, using the LO signal, the analog wireless communication signal to an RF wireless communication signal at a particular operating frequency. In some embodiments, an embedded filter in the analog transmitter 112 may be used as a low-pass, band-pass, or high-pass filter to condition the RF wireless communication signal. The desired frequency ranges, to be selected or eliminated, in the various types of filters may be application dependent. In some embodiments, an amplifier may be embedded in the analog transmitter 112 to amplify the RF wireless communication signal prior to propagation by the antenna 18. The duplexer 116 receives the amplified RF wireless communication signal and produces the signal to the antenna 118, which is used to wirelessly transmit the RF signal to another device in the wireless communications network.

The receive path of the transceiver 100 includes the antenna 118, the duplexer 116, the analog receiver 114, the ADC 108, the modem 104, and the processor 102. The antenna 118 receives an RF wireless communication signal from, for example, another host device or a base station in the wireless communications network. The RF wireless communication signal is directed, using the duplexer 116, to the analog receiver 114. In some embodiments, an amplifier, for example a low noise amplifier, may be used to amplify the RF wireless communication signal. In some embodiments, an embedded filter, for example a low-pass, band-pass, or high-pass filter, may be used to condition the received RF wireless communication signal. In some embodiments, an embedded mixer in the analog receiver 114 may receive an LO signal from the phase locked loop 110, which is phase synchronized with the common clock of the host device. The mixer down-converts the RF wireless communication signal using the LO signal to a baseband wireless communication signal. The ADC 160 converts the analog wireless communication signal to a digital wireless communication signal. The modem 104 and the processor 102 receive and process the digital wireless communication signal.

The receive and transmit paths of the transceiver 100 typically operate at different carrier frequencies when using the frequency division duplex (FDD) technique. However, when using time division duplex (TDD) techniques, such as in WiFi or WiGig, the transmit and receive paths may operate at different time slots but at the same carrier frequency. Therefore, in the transceiver 100, a single antenna may be sufficient for the transmitting and receiving.

As noted, a typical wireless sensing transceiver, unlike a wireless communication transceiver, may operate as a stand-alone device. And, as the transmitted signal and the reflected received signal are transmitted and received near-simultaneously, a wireless sensing transceiver necessitates multiple antennas. FIG. 2 is a diagram of an embodiment wireless sensing transceiver 150 used for wireless sensing, which may be installed in a host device.

In a typical wireless sensing operation, an RF signal is transmitted and a reflection of the RF signal is received. The reflected RF signal is then analyzed to, for example, monitor a heartbeat rate, monitor a respiratory rate, detect objects, determine a location of an object, determine a movement of an object, etc. As an example, to monitor the respiratory rate, a pulsed or continuous RF signal may be directed to a chest of a user. A time-based analysis of the reflected signals from the chest can be performed to estimate the respiratory rate due to the movement of the chest. In another example, to monitor the heartbeat, a pulsed or continuous RF signal may be directed to person. The reflected RF signals are analyzed in accordance with the detection time and frequency of the reflected signal. In one embodiment, the RF signal is a pulsed signal. In other embodiments, the RF signal may be a continuous wave signal. In some embodiments, the distance between the wireless sensing transceiver 150 and a reflected service may be very short (e.g., in the millimeter range). In other embodiments, the distance between the wireless sensing transceiver 150 may be large (e.g., multiple meters).

As shown, the wireless sensing transceiver 150 includes a processor 102, a memory 103, a digital transmitter 154, a digital receiver 156, a DAC 106, an ADC 108, a phase locked loop 110, an analog transmitter 112, an analog receiver 114, and a pair of antennas 118 and 158, which may (or may not) be arranged as shown in FIG. 2. In the wireless sensing transceiver 15o, a pre-defined probing signal, such as a single-tone waveform, frequency-modulated continuous waveform (FMCW), or a stepped frequency waveform may be transmitted by the antenna 118. The transmitted signal may be reflected off an object 160 and the reflected RF signal is then received at the antenna 158. The wireless sensing transceiver 150 near-simultaneously transmits and receives a reflection of the probing signal, which is then processed to extract information relating to the reflected object 160. The processing of the reflected probing signal allows the wireless sensing transceiver 150 to, for example, detect objects (e.g., humans), determine the location, determine a movement, or detect other high level physiological features (e.g., breathing rate, heart beat rate, etc.). The transmit and receive paths in the wireless sensing transceiver 150 may operate at the same frequency and may carry a sensing signal at the same time.

The wireless sensing transceiver 150 includes a digital transmitter 154, a digital receiver 156, and a second antenna 158 not originally found in the transceiver 100. The digital transmitter 154 is any component or collection of components used to generate a digital wireless sensing signal. The digital receiver 156 is any component or collection of components used to receive a digital wireless sensing signal.

The digital receiver 156 may use or include an estimation algorithm based on a discrete Fourier transform (DFT), to detect a distance of a target, to determine a Doppler frequency shift, for down-sampling the probing signal, or for other processing tasks of the reflected signal.

In transmit, the digital transmitter 154 generates a digital wireless sensing signal. In one embodiment, the processor 102 generates a signal to be driven by the digital transmitter 154. In another embodiment, the wireless sensing transceiver 150 may optionally include a tone generator (not shown) that is driven by the digital transmitter 154. In one such embodiments, the optional tone generator or the digital transmitter may be controlled using the processor 102 to generate the digital wireless signal. The DAC 106 converts the digital wireless sensing signal to an analog wireless sensing signal. A mixer in the analog transmitter 112 may up-convert the analog wireless sensing signal to an RF wireless sensing signal using an LO signal from the phase locked loop 110. In some embodiments, a filter embedded in the analog transmitter 112 may be used to condition the RF signal to remove, for example unwanted noise existing at other frequencies. In some embodiments, an amplifier in the analog transmitter may amplify the RF sensing signal prior to transmission. The RF sensing signal is then transmitted using the antenna 118.

In receive, the antenna 158 receives an RF wireless sensing signal that is a reflection of the transmitted RF wireless signal using antenna 118. As the wireless sensing transceiver 150 has two separate antennas for transmit and receive, a duplexer is unnecessary. An example of a reflected signal is a reflection from a body part, such as skin, which is then processed to detect the heartbeat of a user. It should be appreciated that the reflected signal may be a reflection of other objects and can be used in a variety of applications. The received RF wireless signal may be amplified using, for example an embedded low noise amplifier in the analog receiver 114. In some embodiments, the analog receiver 114 may include a filter to remove unwanted RF signals operating at different frequencies from the operating frequency of the wireless sensing transceiver 150. An embedded mixer in the analog receiver 114 may down-convert the received RF wireless signal using an LO signal from the phase locked loop 110 to an analog wireless sensing signal. The processor and the digital receiver 156 may then process the reflected sensing signal.

It should be appreciated that there are several differences between a transceiver used for wireless sensing and a transceiver used for wireless communications. As an example, each transceiver may transmit a different signal type. Correspondingly, the signal processing at the receiver side of each transceiver may also be different. Likewise, particular characteristics of one transceiver do not necessarily apply to the other. As an example, the leakage signal from the transmit antenna to the receive antenna in wireless sensing, which has near-simultaneous transmit and receive characteristics, can be greater than the desired reflection signal. As a result, various methods may be used to address this interference issue in wireless sensing applications. This is typically not an issue with wireless communications.

It should also be appreciated that in wireless sensing, which uses self-mixing technology (i.e., same carrier signal used for transmit and receive), the baseband bandwidth is typically narrower than the baseband in wireless communications. In wireless communications, the channel capacity of a communication channel, or alternatively the data rate communicated over a channel, is directly correlated with the bandwidth of the channel. Therefore, in wireless communications to transfer large amounts of data, a larger bandwidth is preferable. In contrast, a narrow bandwidth is desired in wireless sensing. For example, a vital sign signal to be monitored by a wireless sensing device has a very narrow bandwidth (e.g., a typical respiration is less than half a Hertz (Hz) and a heartbeat is just over a Hz). In such an example, the baseband bandwidth is minimized to only allow the passage of vital sign signals and to block the passage of high frequency interferences. As an example, the baseband bandwidth for wireless communication signals may be 1.76 GHz, while the baseband bandwidth for wireless sensing may be 2 MHz.

As shown, the wireless sensing transceiver 150 may share several common component blocks with the transceiver 100. The common components of the transceiver 100 and the wireless sensing transceiver 150 are a processor 102, a memory 103, a DAC 106, an ADC 108, a phase locked loop 110, an analog transmitter 112, an analog receiver 114, and an antenna 118. Embodiments of this disclosure advantageously provide an alternative structure of a transceiver that can operate in both wireless communications and wireless sensing, benefiting from common components found in the distinct transceivers.

FIG. 3 is a diagram of an embodiment transceiver 200 for communicating wireless communication and wireless sensing signals, which may be installed in a host device. As shown, the transceiver 200 includes a processor 102, a memory 103, a modem 104, a wireless sensing digital transmitter 154, a wireless sensing digital receiver 156, a DAC 106, an ADC 108, a phase locked loop 110, an analog transmitter 112, an analog receiver 114, and a pair of antennas 118 and 158, which may (or may not) be arranged as shown in FIG. 3. It should be appreciated that the phase locked loop 11o may provide an LO signal as an input to the analog receiver 114.

In this embodiment, wireless sensing capabilities are added to an existing wireless communication system. This is accomplished by adding the second antenna 158, the wireless sensing digital transmitter 154, and the wireless sensing digital receiver 156 of the wireless sensing transceiver 150 to the transceiver 100. As the transmit path and the receive path in the transceiver 200 are separate and distinct, a duplexer becomes unnecessary. The duplexer 116 is replaced by the addition of the second antenna 158.

The common components used for wireless sensing and wireless communication are the processor 102, the memory 103, the DAC 106, the ADC 108, the phase locked loop 110, the analog transmitter 112, the analog receiver 114, and the antennas 1n8 and 158. The wireless sensing digital transmitter 154 and the wireless sensing digital receiver 156 are used mainly for wireless sensing and the modem 104 is used mainly for wireless communications.

The wireless sensing digital transmitter 154 generates wireless sensing probing signals, which are transmitted through the DAC 106, the analog transmitter 112, and then propagated using the antenna 118. The reflected signal is received at the antenna 158, which is then transferred through the analog receiver 114 and the ADC 108, to the wireless sensing digital receiver 156. The signal is then processed using the processor 102 and the memory 103. Thus, the transceiver 200 advantageously adds wireless sensing capabilities to an original single-antenna communication transceiver at the cost of an additional antenna and two low-cost digital blocks.

In wireless communications, the processor 102, the memory 103, and the modem 104 generate a wireless communication signal, which is transmitted through the DAC 106 and the analog transmitter 112, which is then propagated using the antenna 118. A received communications signal is received at the antenna 158, which then travels through the analog receiver 114 and the ADC 108 to the modem 104, where it is processed by the processor 102 and the memory 103.

It should be noted that wireless communications and wireless sensing are two different operating modes of the transceiver 200. The operational mode can be selected automatically, for example using high-level software or manually. As an example, a cellular phone can switch to communication mode to transmit data, while operating in sensing mode at other times.

Figure 4:
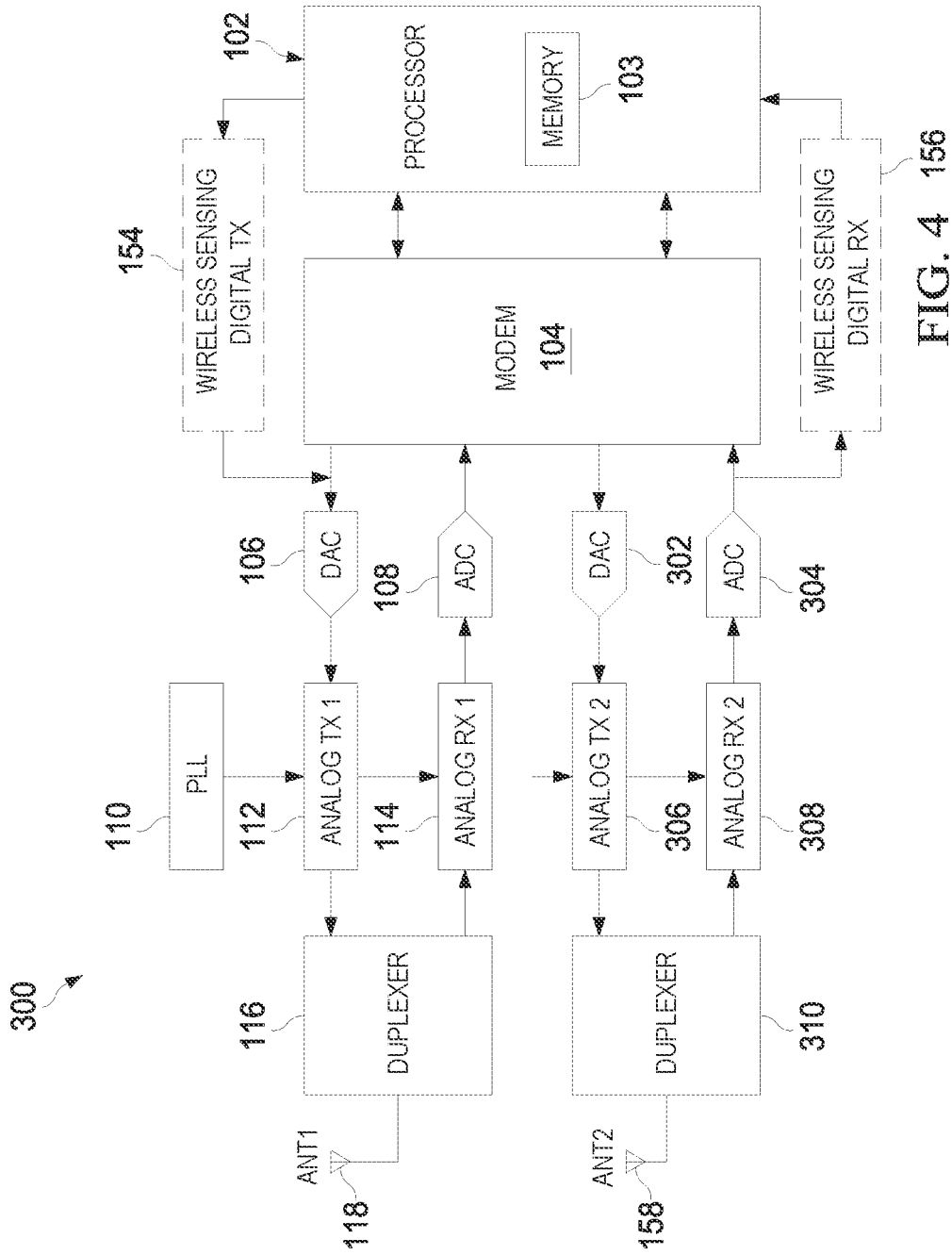
FIG. 4 is another diagram of an embodiment transceiver for communicating wireless communication and wireless sensing signals.

FIG. 4 is a diagram of an embodiment transceiver 300 for communicating wireless communication and wireless sensing signals, which may be installed in a host device. As shown, the transceiver 300 includes a processor 102, a memory 103, a modem 104, a wireless sensing digital transmitter 154, a wireless sensing digital receiver 156, a pair of DACs 106 and 302, a pair of ADCs 108 and 304, a phase locked loop 110, a pair of analog transmitters 112 and 306, a pair of analog receivers 114 and 308, a pair of duplexers 116 and 310, and a pair of antennas 118 and 312, which may (or may not) be arranged as shown in FIG. 4. It should be appreciated that the phase locked loop 11 may provide an LO signal as an input to the analog transmitters 112 and 306 and the analog receivers 114 and 308.

In this embodiment, wireless sensing capabilities are added to a two-antenna wireless communication transceiver. This is accomplished by adding the wireless sensing digital transmitter 154 and the wireless sensing digital receiver 156 to the two-antenna wireless communication transceiver. As the transceiver 300 is equipped with multiple transmit and receive paths, the transceiver 300 may have additional capabilities in comparison to the transceiver 200. In some embodiments, the wireless communication may be applicable to 2×2 multiple-input multiple output (MIMO) radar techniques. In some applications, the wireless transceiver 300 may be able to communicate with two different devices within the wireless communications network.

The transceiver 300 advantageously adds wireless sensing capabilities to an original two-antenna wireless communication transceiver, such as a two-antenna WiFi transceiver of a smartphone. The original two-antenna wireless communication transceiver includes two antennas, two transmit path chains, and two receive path chains for better communication performance (e.g., higher data transmission rate). To reuse the original wireless communication transceiver, one of the two antennas in addition to one transmit path chain for transmitting a probing signal and one receive path chain for near-simultaneous receiving may be used for wireless sensing.

The common components used for wireless sensing and wireless communication are the processor 102, the memory 103, the DAC 106, the ADC 304, the phase locked loop 110, the analog transmitter 112, the analog receiver 308, the duplexers 116 and 310, and the antennas 118 and 158. The wireless sensing digital transmitter 154 and the wireless sensing digital receiver 156 are used for wireless sensing. The modem 104 is used for wireless communication. The ADC 108 and the analog receiver 114 are used in a second receive path of the wireless communication, while the DAC 302 and the analog transmitter 306 are used in a second transmit path of the wireless communication.

The wireless sensing digital transmitter 154 generates wireless sensing probing signals, which are transmitted through the DAC 106, the analog transmitter 112, and then propagated using the antenna 118 by the direction of the duplexer 116. The reflected sensing RF signal is received at the antenna 158, which is then transferred through the analog receiver 308 and the ADC 304, to the wireless sensing digital receiver 156. The signal is then processed using the processor 102 and the memory 103. Thus, the transceiver 300 advantageously adds wireless sensing capabilities to an original dual-antenna communication transceiver at the cost of two low-cost digital blocks.

In a first path used for wireless communications, the processor 102, the memory 103, and the modem 104 generate a wireless communication signal, which is transmitted through the DAC 106 and the analog transmitter 112, which is then propagated using the antenna 118 by the directing of the duplexer 116. In a second path used for wireless communications, the processor 102, the memory 103, and the modem 104 generate a wireless communication signal, which is transmitted through the DAC 302 and the analog transmitter 306, which is then propagated using the antenna 158 by the directing of the duplexer 310.

In a first path used for wireless communications, a received communications signal is received at the antenna 118, which then travels through the analog receiver 114, by the directing of the duplexer 116, and the ADC 108 to the modem 104, where it is processed by the processor 102 and the memory 103. In a second path used for wireless communications, a received communications signal is received at the antenna 158, which then travels through the analog receiver 308, by the directing of the duplexer 310, and the ADC 304 to the modem 104, where it is processed by the processor 102 and the memory 103.

Figure 5:
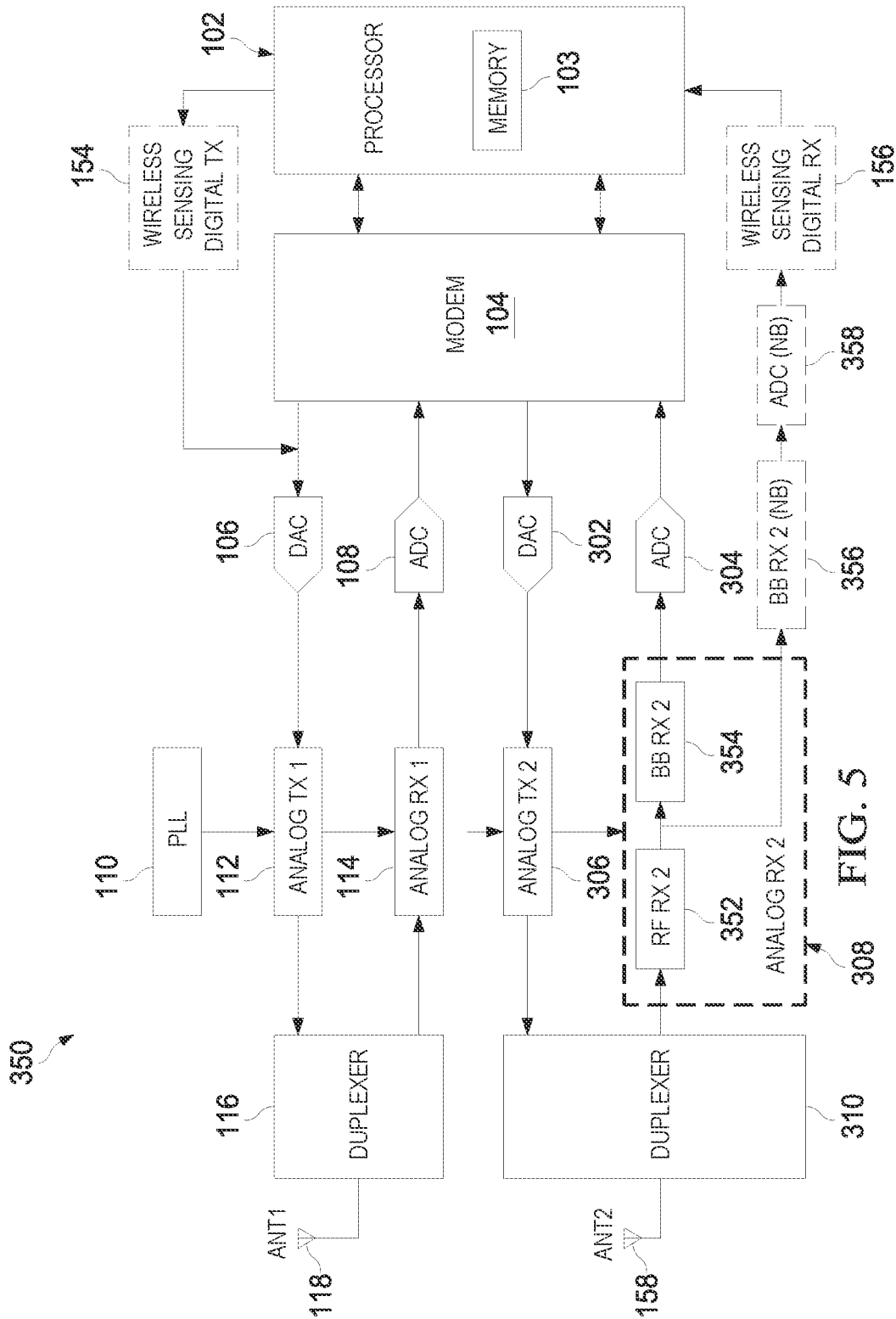
FIG. 5 is yet another diagram of an embodiment transceiver for communicating wireless communication and wireless sensing signals.

FIG. 5 is a diagram of an embodiment transceiver 350 for communicating wireless communication and wireless sensing signals, which may be installed in a host device. As shown, the transceiver 350 includes a processor 102, a memory 103, a modem 104, a wireless sensing digital transmitter 154, a wireless sensing digital receiver 156, a pair of DACs 106 and 302, several ADCs 108, 304, and 358, a phase locked loop 110, a pair of analog transmitters 112 and 306, a pair of analog receivers 114 and 158, a pair of duplexers 116 and 310, a pair of antennas 118 and 312, and an analog baseband (BB) receiver 356, which may (or may not) be arranged as shown in FIG. 5. It should be appreciated that the phase locked loop 110 may provide an LO signal as an input to the analog transmitters 112 and 306 and the analog receivers 114 and 308. The analog receiver 308 includes an RF component 352 and an analog component 354. The ADC 358 is a low-sample rate/high resolution ADC.

The RF component of the analog receiver 308 may include RF related components, such as the mixer and the low noise amplifier. The analog component of the analog receiver 308 may include non-RF related components, such as a low-pass filter.

As noted, wireless communications and wireless sensing transceivers may have different operating requirements. In particular, these differences may be applicable to the analog baseband receiver and the ADC. In some embodiments, the wireless sensing signal may have a lower bandwidth and a larger dynamic range at baseband in comparison to the wireless communication signal. The analog baseband receiver and ADC of a typical wireless communication transceiver may not satisfy the operating requirements of the wireless sensing signal. Therefore, in some embodiments, the analog baseband receiver 356, having a narrowband analog baseband, may be used for wireless sensing. And, the ADC 358 connected to the analog base band receiver 356 may be a high-resolution and/or low sample rate ADC in comparison to the ADCs 108 and 304. This adaptive solution of sampling at different rates for different signals can be advantageous in reducing operating power and improving system efficiency.

Generally, the high-resolution ADC corresponds to an ADC having a bit rate greater than or equal to 10-bits. In contrast, a low-resolution ADC or a typical ADC corresponds to an ADC having a bit rate less than 10-bits. Generally, a high sample rate ADC corresponds to an ADC having a sampling rate greater than or equal to 100 MHz. In contrast, a low sample rate or a typical sample rate corresponds to a sampling rate less than 100 MHz. It should be appreciated that the sampling rate and resolution are application dependent and vary as a result. As an example, a high-speed low resolution ADC corresponds to an ADC having 8 bits at 800 MHz, while a low-speed high-resolution ADC corresponds to an ADC having 14 bits at 4 MHz.

The modified transceiver 350 advantageously adds wireless sensing to a dual-antenna wireless communication transceiver without adding any additional antennas. The inclusion of a narrowband/high dynamic range baseband receiver and a high resolution/low sample rate ADC improves performance and robustness for wireless sensing.

In the transceiver 350, wireless sensing capabilities are added to an existing wireless communication system having two separate communication paths. The wireless sensing digital transmitter 154 is added to one of the transmit paths originally used for wireless communication. The wireless sensing digital receiver 156, the ADC 358, and the analog baseband receiver 356 are added to one of the receive paths originally used for wireless communication.

The common components used for wireless sensing and wireless communication are the processor 102, the memory 103, the DAC 106, the phase locked loop 110, the analog transmitter 112, the RF component 352 of the analog receiver 308, the duplexers 116 and 310, and the antennas 118 and 158. The wireless sensing digital transmitter 154, the wireless sensing digital receiver 156, the ADC 358, and the analog baseband receiver 356 are used for wireless sensing.

The modem 104 is used for wireless communication. The ADC 108 and the analog receiver 114 are used in a second receive path of the wireless communication, while the DAC 302 and the analog transmitter 306 are used in a second transmit path of the wireless communication. A wireless communication receive path, semi-shared with wireless sensing, includes the analog component 354 of the analog receiver 308 and the ADC 304.

The wireless sensing digital transmitter 154 generates wireless sensing probing signals, which are transmitted through the DAC 106, the analog transmitter 112, and then propagated using the antenna 118 by the direction of the duplexer 116. The reflected sensing RF signal is received at the antenna 158, which is then transferred through the RF component 352 of the analog receiver 308, the analog baseband receiver 356, and the ADC 358, to the wireless sensing digital receiver 156. The signal is then processed using the processor 102 and the memory 103. Thus, the transceiver 35*o* advantageously adds wireless sensing capabilities to an original dual-antenna communication transceiver at the cost of two low-cost digital blocks and two low-cost analog blocks.

In a first transmit path used for wireless communications, the processor 102, the memory 103, and the modem 104 generate a wireless communication signal, which is transmitted through the DAC 106 and the analog transmitter 112, which is then propagated using the antenna 118 by the directing of the duplexer 116. In a second transmit path used for wireless communications, the processor 102, the memory 103, and the modem 104 generate a wireless communication signal, which is transmitted through the DAC 302 and the analog transmitter 306, which is then propagated using the antenna 158 by the directing of the duplexer 310.

In a first receive path used for wireless communications, a received communications signal is received at the antenna 118, which then travels through the analog receiver 114, by the directing of the duplexer 116, and the ADC 108 to the modem 104, where it is processed by the processor 102 and the memory 103. In a second receive path used for wireless communications, a received communications signal is received at the antenna 158, which then travels through the analog receiver 308, by the directing of the duplexer 310, and the ADC 304 to the modem 1*o*4, where it is processed by the processor 102 and the memory 103.

Figure 6:
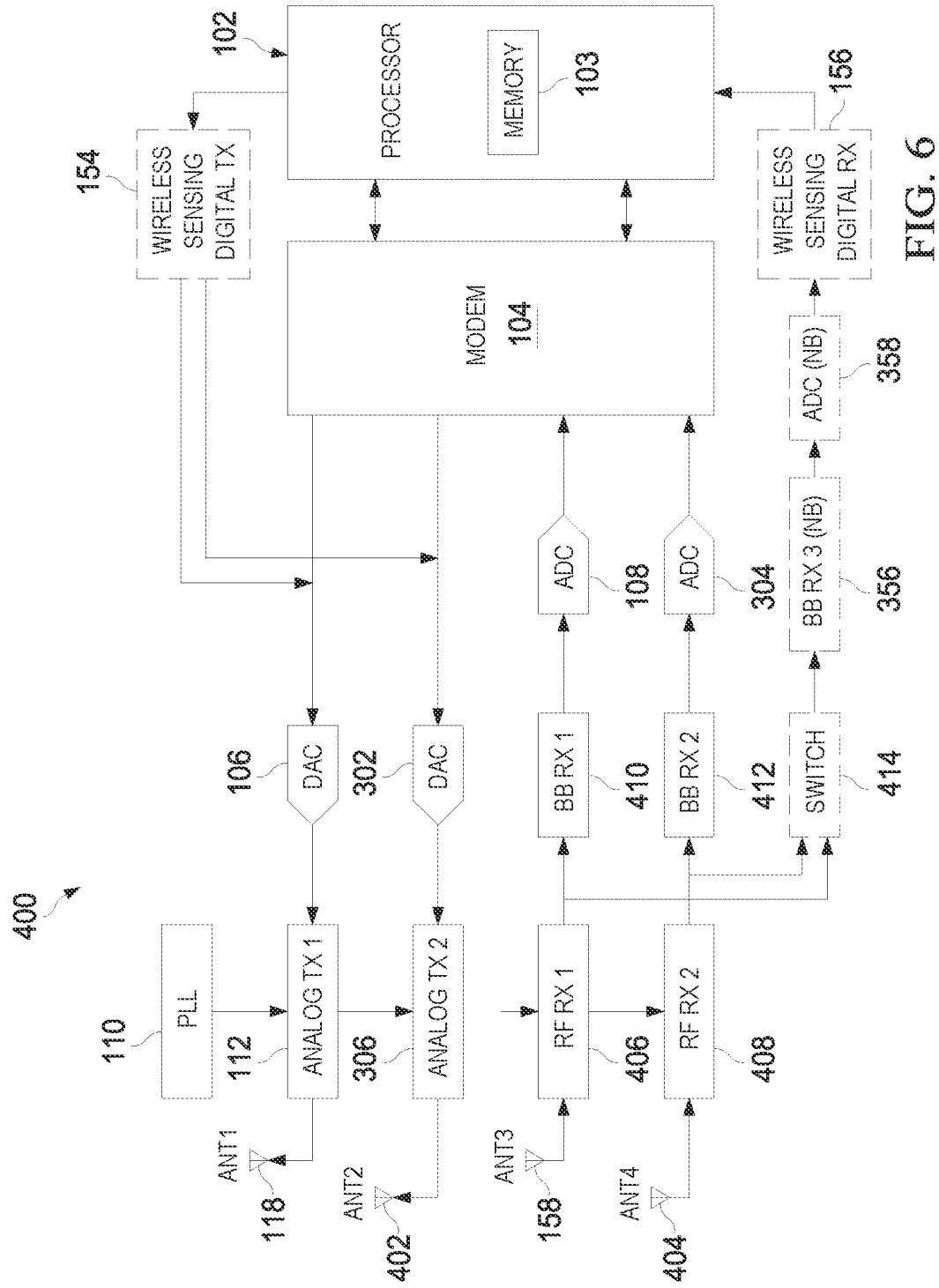
FIG. 6 is another diagram of an embodiment transceiver for communicating wireless communication and wireless sensing signals.

FIG. 6 is a diagram of an embodiment transceiver 400 for communicating wireless communication and wireless signals, which may be installed in a host device. As shown, the transceiver 400 includes a processor 102, a memory 103, a modem 104, a wireless sensing digital transmitter 154, a wireless sensing digital receiver 156, a pair of DACs 106 and 302, several ADCs 108, 304, and 358, a phase locked loop 110, a pair of analog transmitters 112 and 306, a pair of RF analog receivers 406 and 408, several analog baseband receivers 410, 412, and 356, a switch 414, and multiple antennas 118, 158, 402, and 404, which may (or may not) be arranged as shown in FIG. 6.

It should be appreciated that the phase locked loop 110 may provide an LO signal as an input to the analog transmitters 112 and 306 and the RF analog receivers 406 and 408. It should also be appreciated that even though 4 antennas are showed in FIG. 6, a transceiver with more antennas and additional transmit and receive paths may be contemplated to account for, for example, 8×8 MIMO, etc. The RF analog receivers 406 and 408 may include RF related components, such as the mixer and the low noise amplifier. The analog baseband receivers 410 and 412 may include non-RF related components, such as a low-pass filter. The multiple antennas of the transceiver 400 may be used for multiple-input and multiple-output (MIMO) method in a wireless communication. MIMO is used for multiplying the capacity of a radio link using multiple antennas, for example to exploit multipath propagation.

The transceiver 400 adds wireless sensing to an original wireless communication transceiver having multiple antennas, for example in a WiGig transceiver. In transmit, the wireless sensing probing signal may be transmitted using either of the transmit paths simultaneously or alternatively to each other. In receive, the switch 414 may be used to sample the reflected signal in alternate sequences for processing by the wireless sensing digital receiver 156. The transceiver 400 advantageously adds wireless sensing to the original multiple antenna wireless communication transceiver without adding additional antennas. The transceiver 400 may additionally add capabilities found using the MIMO radar technique to wireless sensing, which can identify a direction of an object that causes the reflection of the wireless sensing probe signal. The inclusion of a narrowband/high dynamic range baseband receiver and a high resolution/low sample rate ADC improves performance and robustness for wireless sensing.

The common components used for wireless sensing and wireless communication are the processor 102, the memory 103, the DACs 106 and 302, the phase locked loop 110, the analog transmitters 112 and 306, the RF analog receivers 406 and 408, and the antennas 118, 158, 402, and 404. The wireless sensing digital transmitter 154, the wireless sensing digital receiver 156, the ADC 358, the analog baseband receiver 356, and the switch 414 are used for wireless sensing. The modem 104, the ADCs 108 and 304, and the analog baseband receivers 410 and 412 are used for wireless communications.

The wireless sensing digital transmitter 154 generates wireless sensing probing signals, which can be transmitted simultaneously or alternatively from two different transmit paths chains. In a first wireless sensing transmit path, the probing signal is transmitted using the antenna 118 after travelling through the DAC 106 and the analog transmitter 112. In a second wireless sensing transmit path, the probing signal is transmitted using the antenna 402 after travelling through the DAC 302 and the analog transmitter 306.

At the receiver side, reflected sensing RF signals are received at both antennas 158 and 404. In a first wireless sensing receive path, the reflected sensing signal is received at the wireless sensing digital receiver 156 after travelling through the RF analog receiver 406, the switch 414, the analog baseband receiver 356, and the ADC 358. In a second wireless sensing path, the reflected sensing signal is received at the wireless sensing digital receiver 156 after travelling through the RF analog receiver 408, the switch 414, the analog baseband receiver 356, and the ADC 358. The switch 414 is used in a switching scheme to alternatively sample the reflected RF signal received at antennas 158 and 404. The transceiver 400 advantageously adds MIMO-related wireless sensing capabilities to an original four-antenna communication transceiver at the cost of two low-cost digital blocks and three low-cost analog blocks.

In a first transmit path used for wireless communications, the processor 102, the memory 103, and the modem 104 generate a wireless communication signal, which is transmitted through the DAC 106 and the analog transmitter 112, which is then propagated using the antenna 118. In a second transmit path used for wireless communications, the processor 102, the memory 103, and the modem 104 generate a wireless communication signal, which is transmitted through the DAC 302 and the analog transmitter 306, which is then propagated using the antenna 402.

In a first receive path used for wireless communications, a received communications signal is received at the antenna 158, which then travels through the RF analog receiver 406, the analog baseband receiver 410, and the ADC 108 to the modem 104, where it is processed by the processor 102 and the memory 103. In a second receive path used for wireless communications, a received communications signal is received at the antenna 404, which then travels through the RF analog receiver 408, the analog baseband receiver 412, and the ADC 304 to the modem 104, where it is processed by the processor 102 and the memory 103.

Figure 7:
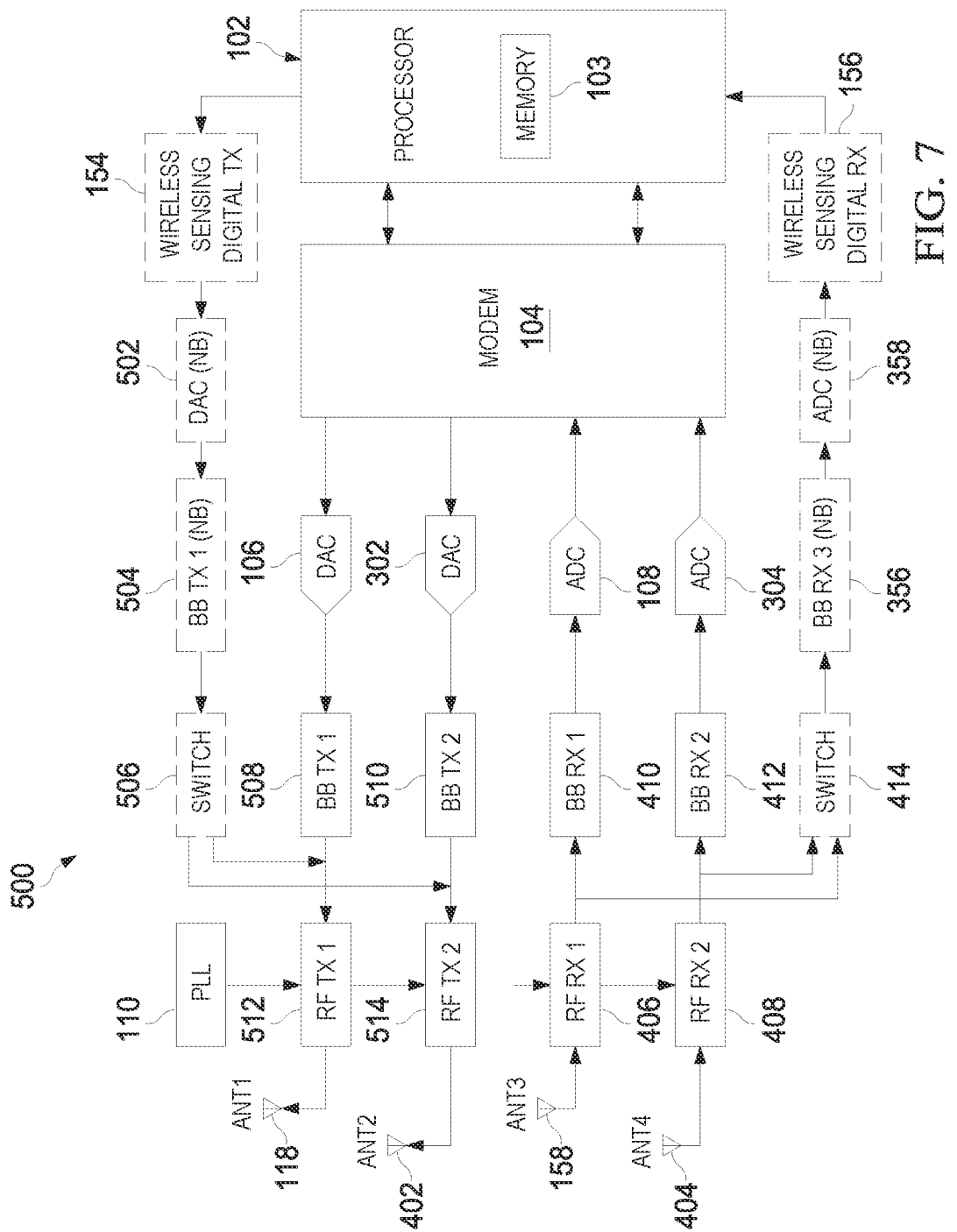
FIG. 7 is another diagram of an embodiment transceiver for communicating wireless communication and wireless sensing signals.

FIG. 7 is a diagram of an embodiment transceiver 500 for communicating wireless communication and wireless signals, which may be installed in a host device. As shown, the transceiver 500 includes a processor 102, a memory 103, a modem 104, a wireless sensing digital transmitter 154, a wireless sensing digital receiver 156, several DACs 106, 302, and 502, several ADCs 108, 304, and 358, a phase locked loop 110, several analog baseband transmitters 508, 510, and 504, a pair of RF analog transmitters 512 and 514, a pair of RF analog receivers 406 and 408, several analog baseband receivers 410, 412, and 356, a pair of switches 414 and 506, and multiple antennas 118, 158, 402, and 404, which may (or may not) be arranged as shown in FIG. 7.

It should be appreciated that the phase locked loop 110 may provide an LO signal as an input to the RF analog transmitters 512 and 514, and the RF analog receivers 406 and 408. It should also be appreciated that even though 4 antennas are showed in FIG. 7, a transceiver with more antennas and additional transmit and receive paths may be contemplated to account for, for example, 8×8 MIMO, etc. The RF analog transmitters 512 and 514 may include RF related components, such as the mixer and the amplifier. The analog baseband transmitters 508 and 510 may include non-RF related components, such as a filter. The multiple antennas of the transceiver 500 may be used for multiple-input and multiple-output (MIMO) method in a wireless communication.

The transceiver 500 adds wireless sensing to an original wireless communication transceiver having multiple antennas, for example in a WiGig transceiver. In transmit, a narrowband DAC 502 and a narrowband baseband transmitter 504 are added for wireless sensing. The narrowband DAC 502 and the narrowband baseband transmitter 504 provide a low-power option for wireless sensing.

Generally, the high-resolution DAC corresponds to a DAC having a bit rate greater than or equal to 10-bits. In contrast, a low-resolution DAC or a typical DAC corresponds to a DAC having a bit rate less than 10-bits. Generally, a high sample rate DAC corresponds to a DAC having a sampling rate greater than or equal to 100 MHz. In contrast, a low sample rate or a typical sample rate DAC corresponds to a DAC having sampling rate less than 100 MHz. It should be appreciated that the sampling rate and resolution are application dependent and vary as a result. As an example, a high-speed low resolution DAC corresponds to a DAC having 8 bits at 800 MHz, while a low-speed high-resolution DAC corresponds to a DAC having 14 bits at 4 MHz. This adaptive solution of sampling at different rates for different signals can be advantageous in reducing operating power and improving system efficiency.

The transceiver 500 may additionally add capabilities found using the MIMO radar technique to wireless sensing, which can identify a direction of an object that causes the reflection of the wireless sensing probe signal. The modified transceiver 500 advantageously adds wireless sensing to a dual-antenna wireless communication transceiver without adding any additional antennas.

The common components used for wireless sensing and wireless communication are the processor 102, the memory 103, the phase locked loop 110, the RF analog transmitters 512 and 514, the RF analog receivers 406 and 408, and the antennas 118, 158, 402, and 404. The wireless sensing digital transmitter 154, the wireless sensing digital receiver 156, the DAC 502, the ADC 358, the analog base band transmitter 504, the analog baseband receiver 356, and the switches 506 and 414 are used for wireless sensing. The modem 104, the DACs 106 and 302, the ADCs 108 and 304, the analog baseband transmitters 508 and 510, and the analog baseband receivers 410 and 412 are used for wireless communications.

The wireless sensing digital transmitter 154 generates wireless sensing probing signals, which can be transmitted simultaneously or alternatively from two different transmit paths chains. The probing signal travels through the DAC 502, the analog baseband transmitter 504, and then split at the switch 506 to the two transmit path chains. In a first wireless sensing transmit path, the probing signal is transmitted using the antenna 118 after travelling through the RF analog transmitter 512. In a second wireless sensing transmit path, the probing signal is transmitted using the antenna 402 after travelling through RF analog transmitter 514.

At the receiver side, reflected sensing RF signals are received at both antennas 158 and 404. In a first wireless sensing receive path, the reflected sensing signal is received at the wireless sensing digital receiver 156 after travelling through the RF analog receiver 406, the switch 414, the analog baseband receiver 356, and the ADC 358. In a second wireless sensing path, the reflected sensing signal is received at the wireless sensing digital receiver 156 after travelling through the RF analog receiver 408, the switch 414, the analog baseband receiver 356, and the ADC 358. The switch 414 is used in a switching scheme to alternatively sample the reflected RF signal received at antennas 158 and 404.

In a first transmit path used for wireless communications, the processor 102, the memory 103, and the modem 104 generate a wireless communication signal, which is transmitted through the DAC 1o6, the analog baseband transmitter 508, and RF analog transmitter 512, which is then propagated using the antenna 118. In a second transmit path used for wireless communications, the processor 102, the memory 103, and the modem 104 generate a wireless communication signal, which is transmitted through the DAC 302, the analog baseband transmitter 510, and the RF analog transmitter 514, which is then propagated using the antenna 402.

In a first receive path used for wireless communications, a received communications signal is received at the antenna 158, which then travels through the RF analog receiver 406, the analog baseband receiver 410, and the ADC 108 to the modem 104, where it is processed by the processor 102 and the memory 103. In a second receive path used for wireless communications, a received communications signal is received at the antenna 404, which then travels through the RF analog receiver 408, the analog baseband receiver 412, and the ADC 304 to the modem 104, where it is processed by the processor 102 and the memory 103.

Figure 8:
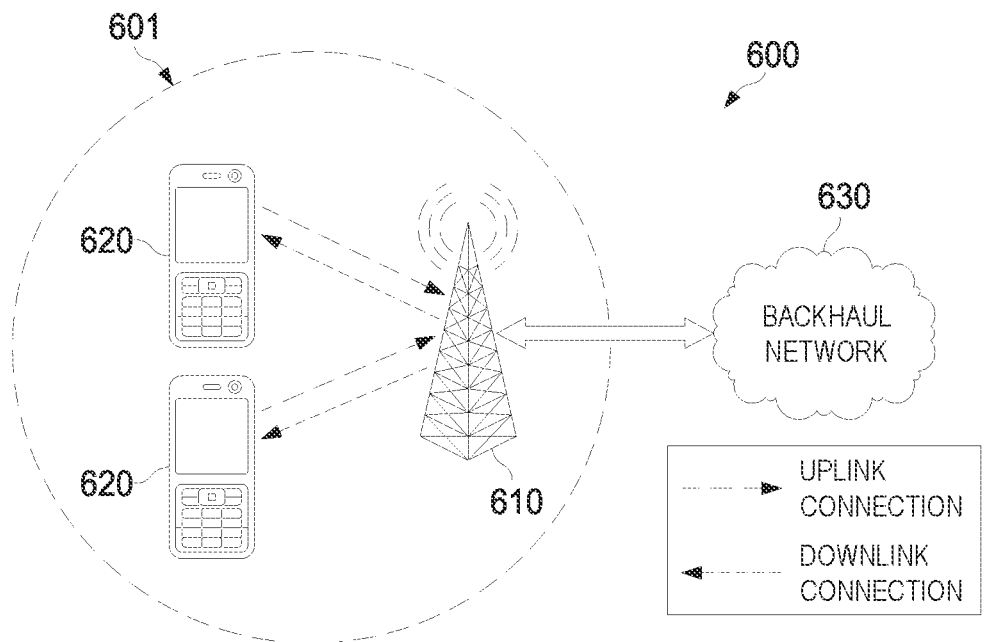
FIG. 8 is a diagram of an embodiment wireless communications network.

FIG. 8 is a diagram of a network 600 for communicating data. The network 600 includes a base station 610 having a coverage area 601, a plurality of UEs 620, and a backhaul network 630. As shown, the base station 610 establishes uplink (dashed line) and/or downlink (dotted line) connections with the UEs 620, which serve to carry data from the UEs 620 to the base station 61o and vice-versa. Datacommunicated over the uplink/downlink connections may include data communicated between the UEs 620, as well as data communicated to/from a remote-end (not shown) by way of the backhaul network 630. As used herein, the term "base station" refers to any network-side device configured to provide wireless access to a network, such as an enhanced Node B (eNodeB or eNB), a gNB, a transmit/receive point CTRP), a macro-cell, a femtocell, a Wi-Fi Access Point (AP), and other wirelessly enabled devices. Base stations may provide wireless access in accordance with one or more wireless communication protocols, e.g., 5th generation new radio (5G NR), LTE, LTE advanced (LTE-A), High Speed Message Access (HSPA), Wi-Fi 802.11a/b/g/n/ac, etc. As used herein, the term "UE" refers to any user-side device configured to access a network by establishing a wireless connection with a base station, such as a mobile device, a mobile station (STA), a vehicle, and other wirelessly enabled devices. In some embodiments, the network 600 may include various other wireless devices, such as relays, low power nodes, etc. While it is understood that communication systems may employ multiple access nodes capable of communicating with a number of UEs, only one base station 610, and two UEs 620 are illustrated for simplicity.

Figure 9:
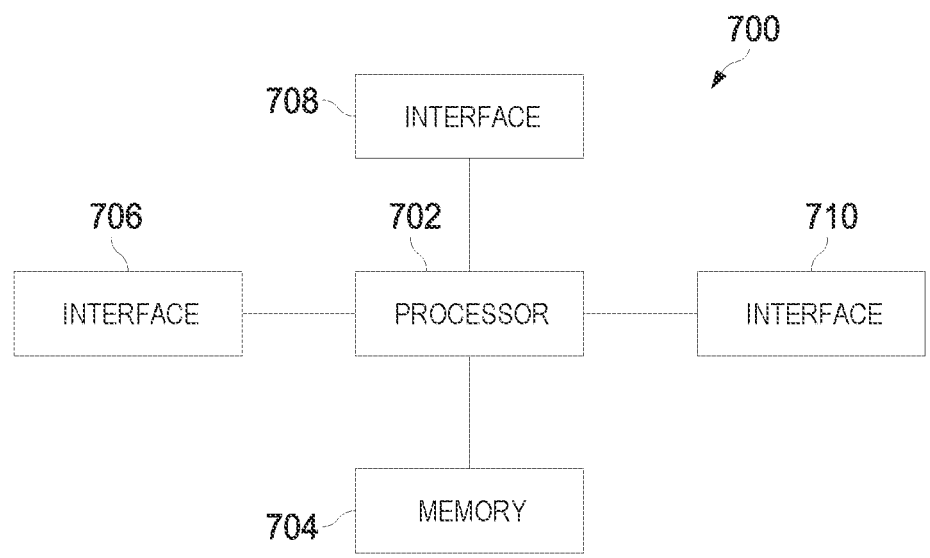
FIG. 9 is a diagram of an embodiment processing system.

FIG. 9 illustrates a block diagram of another embodiment processing system 700 for performing methods described herein, which may be installed in a host device. As shown, the processing system 700 includes a processor 702, a memory 704, and interfaces 706, 708, 710 which may (or may not) be arranged as shown in FIG. 9. The processor 702 may be any component or collection of components adapted to perform computations and/or other processing related tasks, and the memory 704 may be any component or collection of components adapted to store programming and/or instructions for execution by the processor 702. In an embodiment, the memory 704 includes a non-transitory computer readable medium. The interfaces 706, 708, 710 may be any component or collection of components that allow the processing system 700 to communicate with other devices/components and/or a user. In an embodiment, one or more of the interfaces 706, 708, 710 may be adapted to communicate data, control, or management messages from the processor 702 to applications installed on the host device and/or a remote device. As another embodiment, one or more of the interfaces 706, 708, 710 may be adapted to allow a user or user device (e.g., personal computer (PC), etc.) to interact/communicate with the processing system 700. The processing system 700 may include additional components not depicted in FIG. 9, such as long-term storage (e.g., non-volatile memory, etc.).

In some embodiments, the processing system 700 is included in a network device that is accessing, or part otherwise of, a telecommunications network. In one embodiment, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), a wireless capable vehicle, a wireless capable pedestrian, a wireless capable infrastructure element or any other device adapted to access a telecommunications network.

Figure 10:
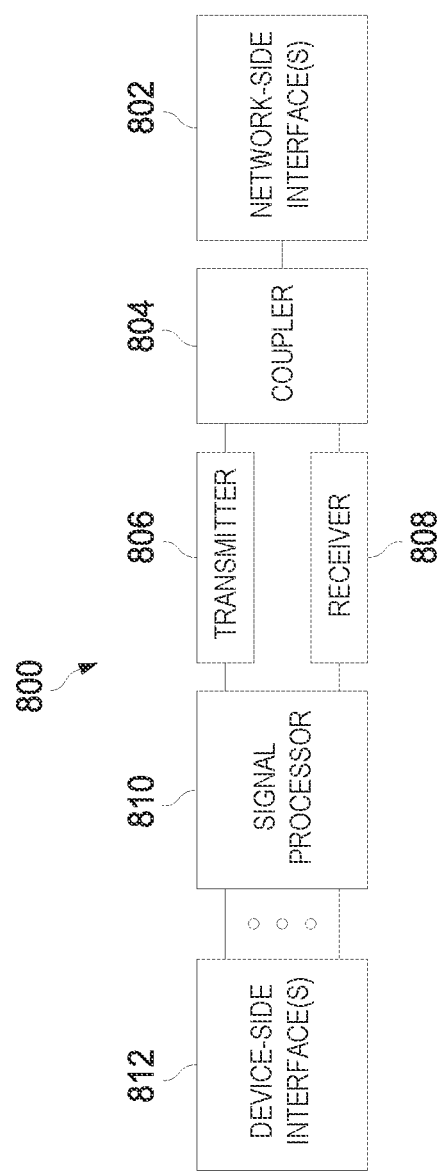
FIG. 10 is a diagram of an embodiment transceiver.

In some embodiments, one or more of the interfaces 706, 708, 710 connects the processing system 700 to a transceiver adapted to transmit and receive signaling over the telecommunications network. FIG. 10 illustrates a block diagram of a transceiver 1000 adapted to transmit and receive signaling over a telecommunications network. The transceiver 800 may be installed in a host device. As shown, the transceiver 800 comprises a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 81o may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 700, local area network (IAN) ports, etc.).

The transceiver 800 may transmit and receive signaling over any type of communications medium. In some embodiments, the transceiver 800 transmits and receives signaling over a wireless medium. In some embodiments, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 comprises one or more antenna/radiating elements. In some embodiments, the network-side interface 802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 11A:
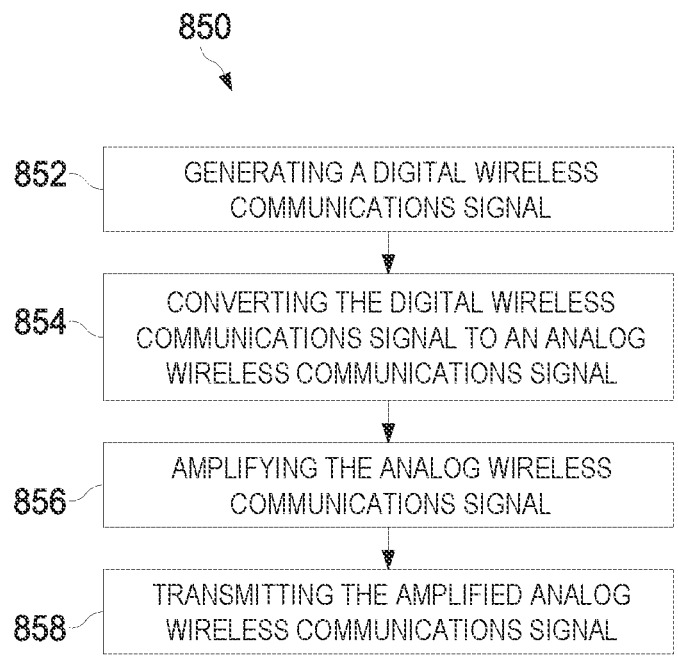
FIGS. 11A-B are flowcharts of embodiment methods for wireless communications in a common transceiver.
Figure 11B:
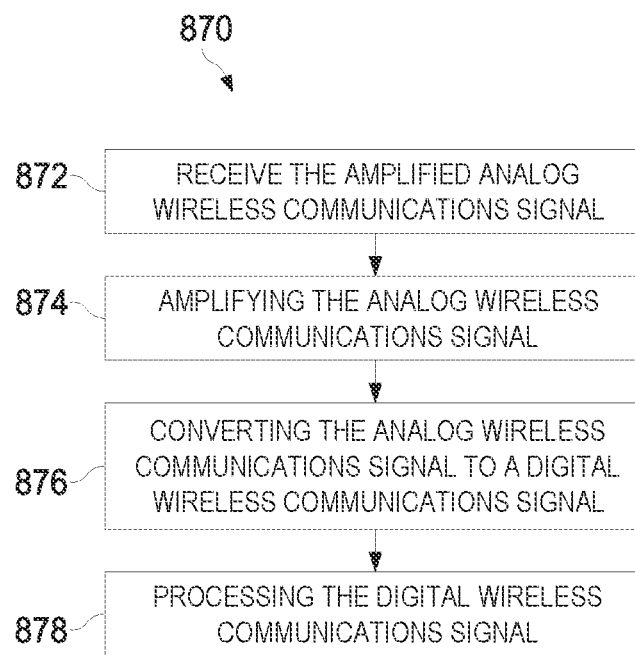

FIGS. 11A-B are flowcharts of embodiment methods for wireless communications, as may be performed by a common transceiver in a host device. FIG. 11A is a flowchart of an embodiment method 850 for wireless communications in a transmit path of the common transceiver. At step 852, the common transceiver generates a digital wireless communications signal using a common processor and a modem of the common transceiver. In some embodiments where the common transceiver has multiple transmit paths, multiple wireless communication signals may be generated for each transmit path. At step 854, the digital wireless communications signal is converted to an analog wireless communications signal using a DAC. In some embodiments, the DAC may be a common component used for both wireless communications and wireless sensing. In some embodiments, the wireless communications and the wireless sensing may each have a different DAC. At step 856, an analog transmitter is used to amplify the analog wireless communications signal. In some embodiments, the analog transmitter may also be used to filter unwanted signals. At step 858, the amplified analog wireless communications signal is transmitted over a common transmitting antenna of the common transceiver.

FIG. 11B is a flowchart of an embodiment method 870 for wireless communications in a receive path of the common transceiver. At step 872, the common transceiver receives an analog wireless communications signal over a common receiving antenna of the transceiver. In some embodiments where the common transceiver has multiple receive paths, multiple wireless communications signals may be received over multiple common receiving antennas. At step 874, an analog receiver may be used to amplify the received analog wireless communications signal. In some embodiments, the analog receiver may also filter out unwanted signals. At step 876, the analog wireless communications signal is converted, using an ADC, to a digital wireless communications signal. In some embodiments, the ADC may be a common component shared between the wireless communication and wireless sensing paths. In some embodiments, each of the wireless sensing and wireless communications may have different ADCs. At step 878, the digital wireless communications signal is processed by a common processor and a modem of the common transceiver.

Figure 12A:
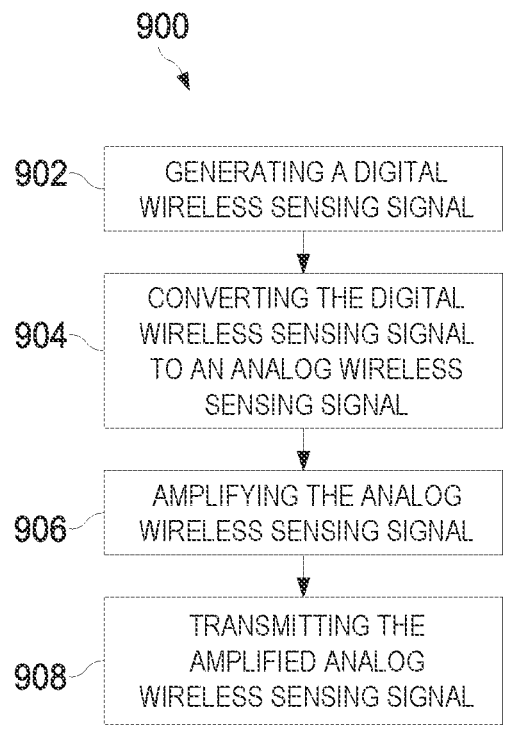
FIGS. 12A-B are flowcharts of embodiment methods for wireless sensing in a common transceiver.
Figure 12B:
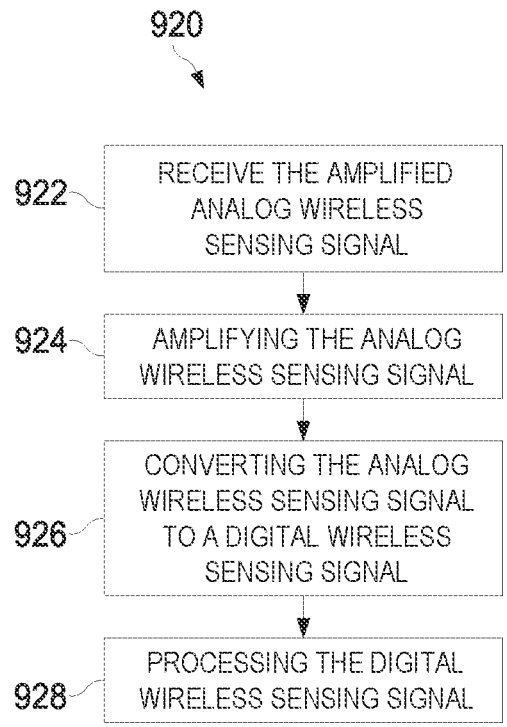

FIGS. 12A-B are flowcharts of embodiment methods for wireless sensing, as may be performed by a common transceiver in a host device. FIG. 12A is a flowchart of an embodiment method goo for wireless sensing in a transmit path of the common transceiver. At step 902, the common transceiver generates a digital wireless sensing signal using a common processor and a wireless sensing digital transmitter. In some embodiments where the common transceiver has multiple transmit paths, multiple wireless sensing signals may be generated. At step 904, the digital wireless sensing signal is converted to an analog wireless sensing signal using a DAC. In some embodiments, the DAC may be shared with the wireless communications path. In some embodiments, the DAC may be capable of operating under a narrower band than the DAC used for wireless communications. At step 906, an analog transmitter may be used to amplify the wireless sensing signal. In some embodiments, the analog transmitter may operate at a baseband different from the analog transmitter used for wireless communications. In some embodiments, a switch may be used to direct multiple wireless sensing signals to multiple transmit paths. At step 908, the amplified analog wireless sensing signal is transmitted over a common antenna of the transceiver.

FIG. 12B is a flowchart of an embodiment method 920 for wireless sensing in a receive path of the common transceiver. At step 922, the common transceiver receives an analog wireless sensing signal over a common receiving antenna of the transceiver. The analog wireless sensing signal being a reflected signal of a wireless sensing signal transmitted by the common transceiver. In some embodiments where the common transceiver has multiple receive paths, multiples wireless sensing signals may be received over multiple common receiving antennas. At step 924, an analog receiver may be used to amplify the received analog wireless sensing signal. In some embodiments, the analog receiver may have a narrowband analog baseband. At step 926, the analog wireless sensing signal is converted to a digital wireless sensing signal using an ADC. In some embodiments, the ADC may be a high-resolution and/or low sample rate ADC in comparison to the ADC used for wireless communications. In some embodiments, a switch may be used to sample wireless sensing signals received at multiple common receiving antennas. In such embodiments, the direction of the object causing the reflection may be determined by sampling of the signals. At step 928, a common processor and a wireless sensing digital receiver may be used to process the wireless sensing signal.

Although the description has been described in detail, it should be understood that various changes, substitutions and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method for wireless communications and wireless sensing, the method comprising:
    converting, by a digital-to-analog converter (DAC) of a device, a first digital wireless communication signal into a first analog wireless communication signal, wherein the DAC receives the first digital wireless communication signal from a first path;
    converting, by the DAC, a first digital wireless sensing signal into a first analog wireless sensing signal, wherein the DAC receives the first digital wireless sensing signal from a second path different from the first path, the first path including a modem of the device, the modem generating the first digital wireless communication signal, the second path bypassing the modem;
    transmitting the first analog wireless communication signal; and
    transmitting the first analog wireless sensing signal.

2. The method of claim 1, further comprising:
    generating, by a processor and the modem of the device, the first digital wireless communication signal; and
    generating, by the processor and a wireless sensing digital transmitter of the device, the first digital wireless sensing signal.

3. The method of claim 1, wherein the transmitting the first analog wireless communication signal and transmitting the first analog wireless sensing signal comprises:
    amplifying, by a common transmit amplifier, the first analog wireless communication signal to obtain an amplified analog wireless communication signal;
    amplifying, by the common transmit amplifier, the first analog wireless sensing signal to obtain an amplified analog wireless sensing signal; and
    transmitting the amplified analog wireless communication signal and the amplified analog wireless sensing signal over a common transmitting antenna.

4. The method of claim 3, further comprising:
    receiving, over a receiving antenna of the device, a second analog wireless communication signal and a second analog wireless sensing signal, the second analog wireless sensing signal being a reflected analog signal of the amplified analog wireless sensing signal; and
    amplifying, by a receive amplifier of the device, the second analog wireless communication signal and the second analog wireless sensing signal.

5. The method of claim 4, further comprising converting, by an analog-to-digital converter (ADC) of the device, the second analog wireless communication signal and the second analog wireless sensing signal into a second digital wireless communication signal and a second digital wireless sensing signal, respectively.

6. The method of claim 4, further comprising:
    converting, by a first analog-to-digital converter (ADC) of the device, the second analog wireless communication signal to a second digital wireless communication signal; and
    converting, by a narrowband analog baseband receiver and a second ADC of the device, the second analog wireless sensing signal to a second digital wireless sensing signal, the second analog wireless sensing signal having a lower bandwidth and a larger dynamic range than the second analog wireless communication signal, the second ADC comprising a higher resolution ADC with a lower sampling rate than the first ADC.

7. The method of claim 6, further comprising:
    processing, by a processor and the modem of the device, the second digital wireless communication signal; and
    processing, by the processor and a wireless sensing digital receiver of the device, the second digital wireless communication signal.

8. The method of claim 4, further comprising:
    synchronizing a communication phase component of the second analog wireless communication signal and a sensing phase component of the second analog wireless sensing signal using a phase-locked loop of the device.

9. The method of claim 1, further comprising:
    synchronizing a communication phase component of the first analog wireless communication signal and a sensing phase component of the first analog wireless sensing signal using a phase-locked loop of the device.

10. The method of claim 1, wherein the first analog wireless sensing signal is used for at least one of gesture recognition, health monitoring, activity recognition, sleep quality detection, or a combination thereof.

11. The method of claim 1, further comprising:
    converting, by a second DAC of the device, a third digital wireless communication signal and a third digital wireless sensing signal into a third analog wireless communication signal and a third analog wireless sensing signal, respectively; and
    transmitting the third analog wireless communication signal and the third analog wireless sensing signal over a second transmitting antenna of the device.

12. The method of claim 11, wherein each analog wireless sensing signal transmitted over each transmitting antenna is used in a multiple-input multiple-output (MIMO) type of wireless sensing radar technique to detect a direction of an object causing a reflection of each transmitted analog wireless sensing signal.

13. The method of claim 11, further comprising:
    receiving, over a second receiving antenna of the device, a fourth analog wireless communication signal and a fourth analog wireless sensing signal, the fourth analog wireless sensing signal being a reflected analog signal of one of the first analog wireless sensing signal or the third analog wireless sensing signal; and
    amplifying, by a second receive amplifier of the device, the fourth analog wireless communication signal and the fourth analog wireless sensing signal.

14. The method of claim 11, wherein the converting the first digital wireless communication signal and the converting the third digital wireless sensing signal are performed in parallel.

15. The method of claim 11, wherein the transmitting the first analog wireless communication signal and the transmitting the third analog wireless sensing signal are performed in parallel.

16. The method of claim 1, further comprising:
alternatively sampling, by a switch of the device, each received analog wireless from each of a plurality of antennas of the device; and
detecting, by a wireless sensing digital receiver and a processor of the device, a direction of an object causing a reflection each transmitted wireless sensing signal in accordance with the alternatively sampling.

17. The method of claim 1, wherein each analog wireless communication signal transmitted over each transmitting antenna is used in a multiple-input multiple-output (MIMO) type of wireless communications radar technique.

18. The method of claim 1, wherein the converting the first digital wireless communication signal and the converting the first digital wireless sensing signal are performed sequentially.

19. The method of claim 1, wherein the transmitting the first analog wireless communication signal and the transmitting the first analog wireless sensing signal are performed in sequentially.

20. The method of claim 1, wherein the first analog wireless communication signal and the first analog wireless sensing signal are transmitted over a common transmitting antenna.

21. The method of claim 1, wherein a communication baseband bandwidth of the first analog wireless communication signal is different from a sensing baseband bandwidth of the first analog wireless sensing signal, and wherein the transmitting the first analog wireless communication signal and the transmitting the first analog wireless sensing signal are operated in different operating modes.

22. A device for wireless communication and wireless sensing, the device comprising:
a digital-to-analog converter (DAC) configured to:
convert a first digital wireless communication signal into a first analog wireless communication signal, wherein the DAC receives the first digital wireless communication signal from a first path; and
convert a first digital wireless sensing signal into a first analog wireless sensing signal, wherein the DAC receives the first digital wireless sensing signal from a second path different from the first path, the first path including a modem of the device, the modem generating the first digital wireless communication signal, the second path bypassing the modem; and
one or more transmitting antennas configured to:
transmit the first analog wireless communication signal and the first analog wireless sensing signal.

\* \* \* \* \*